US011981247B2

(12) United States Patent
Maners et al.

(10) Patent No.: US 11,981,247 B2
(45) Date of Patent: May 14, 2024

(54) PIVOTAL TIE-DOWN

(71) Applicants: Jay R. Maners, Mount Vernon, OH (US); Bryce Maners, Mount Vernon, OH (US)

(72) Inventors: Jay R. Maners, Mount Vernon, OH (US); Bryce Maners, Mount Vernon, OH (US)

(73) Assignee: Maners Mount LLC, Mount Vernon, OH (US)

( * ) Notice: Subject to any disclaimer, the term of this patent is extended or adjusted under 35 U.S.C. 154(b) by 321 days.

(21) Appl. No.: 16/873,538

(22) Filed: Apr. 30, 2020

(65) Prior Publication Data

US 2020/0346576 A1 Nov. 5, 2020

Related U.S. Application Data

(60) Provisional application No. 62/920,452, filed on Apr. 30, 2019.

(51) Int. Cl.
*B60P 7/08* (2006.01)
*F16C 11/04* (2006.01)

(52) U.S. Cl.
CPC ........... *B60P 7/0838* (2013.01); *B60P 7/0807* (2013.01); *F16C 11/04* (2013.01)

(58) Field of Classification Search
CPC ......... B60P 7/08; B60P 7/0838; B60P 7/0807; B60P 7/083; B60P 3/079; B60P 7/0823; E05D 5/02; F16C 11/04
USPC ................ 410/102, 100, 103, 106, 110, 116; 296/184.1
See application file for complete search history.

(56) References Cited

U.S. PATENT DOCUMENTS

| 33,110 | A | * | 8/1861 | Stubbs | B63B 23/58 114/377 |
| 337,582 | A | | 3/1886 | Hildreth | |
| 430,015 | A | | 6/1890 | Hanlon | |
| 765,152 | A | | 7/1904 | Stark | |
| 1,322,499 | A | * | 11/1919 | Mathews | E05B 65/0864 49/276 |
| 1,675,140 | A | | 6/1928 | Schenderlein | |
| 2,738,204 | A | * | 3/1956 | Ibey | B60P 7/083 410/36 |
| 2,895,714 | A | * | 7/1959 | Clark | B66D 3/02 254/371 |
| 2,991,975 | A | * | 7/1961 | Alexander | B66D 1/04 410/103 |
| 3,118,171 | A | | 1/1964 | Parsons | |
| 3,240,473 | A | | 3/1966 | Coffey et al. | |

(Continued)

*Primary Examiner* — Stephen T Gordon
(74) *Attorney, Agent, or Firm* — Andrew C. Pike

(57) ABSTRACT

A tie-down secures a load onto a vehicle. The tie-down has a pivot, a winch, and an anchor. The pivot has a pin, a rotatable sleeve, a cap, and a base. The pin can be either a solid bar, or an annular tube. The winch is attached to the sleeve. The winch has a U-shaped frame comprising two flanges and a wall interconnecting the flanges. The wall is parallel with and attached to the sleeve. The anchor is attached to the base of the pivot. The anchor can be a solid bar, or C-shaped, or two channels sandwiching part of the pin, or annular. The vehicle has a support surface for supporting the load, and a plurality of the tie-downs. The anchor is either attached to the support surface, or, when the vehicle has stake pockets, is removably mountable within a stake pocket.

40 Claims, 10 Drawing Sheets

(56) References Cited

U.S. PATENT DOCUMENTS

| | | |
|---|---|---|
| 3,697,045 A | 10/1972 | Farley |
| 3,825,973 A | 7/1974 | Gwozdz |
| 4,311,288 A * | 1/1982 | Galland ............... B65H 54/585 |
| | | 242/399 |
| 4,360,300 A | 11/1982 | Nadherny et al. |
| 4,373,841 A | 2/1983 | Adler et al. |
| 4,382,736 A * | 5/1983 | Thomas ................. B60P 7/083 |
| | | 410/104 |
| 4,458,881 A | 7/1984 | Jones et al. |
| 4,511,122 A | 4/1985 | Svendsen |
| 4,842,458 A | 6/1989 | Carpenter |
| 4,958,875 A | 9/1990 | Zamzow |
| 5,005,256 A * | 4/1991 | Jang .......................... E05D 5/02 |
| | | 16/384 |
| 5,186,410 A | 2/1993 | Toews |
| 5,431,524 A * | 7/1995 | Antal ....................... B60P 3/06 |
| | | 410/23 |
| 5,499,924 A * | 3/1996 | Arisaka ................. H01R 12/57 |
| | | 439/74 |
| 5,664,918 A * | 9/1997 | Heider et al. ........... B60P 7/083 |
| | | 410/103 |
| 5,775,664 A | 7/1998 | Martin |
| 6,209,942 B1 | 4/2001 | French |
| 6,350,088 B1 | 2/2002 | Priester |
| 6,523,806 B2 | 2/2003 | Bartal |
| 6,527,487 B2 | 3/2003 | Adams |
| 6,558,092 B1 * | 5/2003 | Woodruff .............. B61D 45/001 |
| | | 410/23 |
| 6,565,301 B1 | 5/2003 | Lin |
| 6,626,621 B1 | 9/2003 | Hugg |
| 6,939,095 B1 * | 9/2005 | Hugg ..................... B60P 7/083 |
| | | 410/116 |
| 7,160,069 B2 | 1/2007 | Adams |
| 7,309,205 B2 * | 12/2007 | McCrory ............... B65G 67/42 |
| | | 414/371 |
| 7,431,549 B1 * | 10/2008 | Prentice .................... B60P 7/15 |
| | | 410/106 |
| 7,464,916 B1 | 12/2008 | Drinkhorn |
| 7,537,423 B1 * | 5/2009 | Abato, Jr. ............. B60P 7/0807 |
| | | 410/112 |
| 7,857,000 B1 | 12/2010 | Langdon |
| 8,075,424 B1 | 12/2011 | Hostetler |
| 8,690,502 B1 | 4/2014 | Huang |
| 8,820,811 B1 * | 9/2014 | Hemphill ................. B60R 9/10 |
| | | 296/3 |
| 8,839,906 B1 * | 9/2014 | Furr ....................... E06C 7/482 |
| | | 182/214 |
| 9,016,990 B2 | 4/2015 | Grone |
| 2008/0014041 A1 * | 1/2008 | Randazzo ............. B60P 7/0815 |
| | | 410/104 |

\* cited by examiner

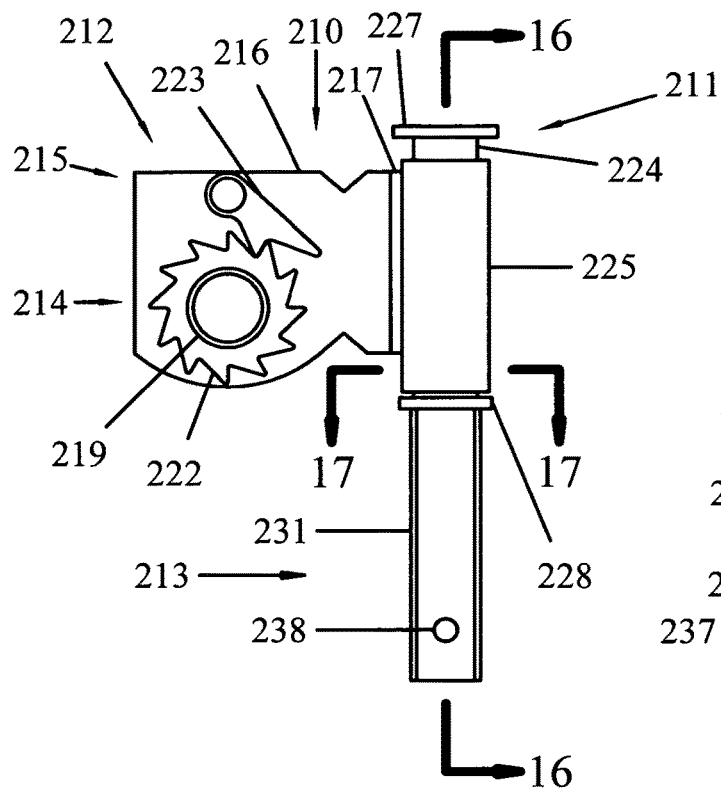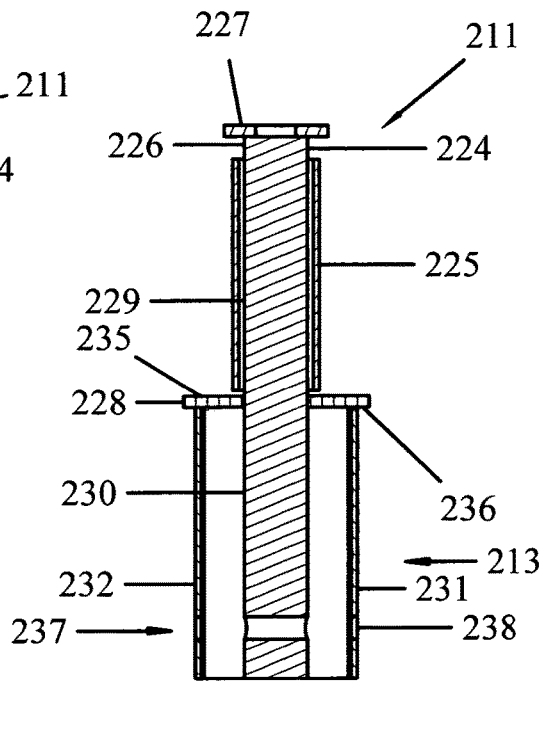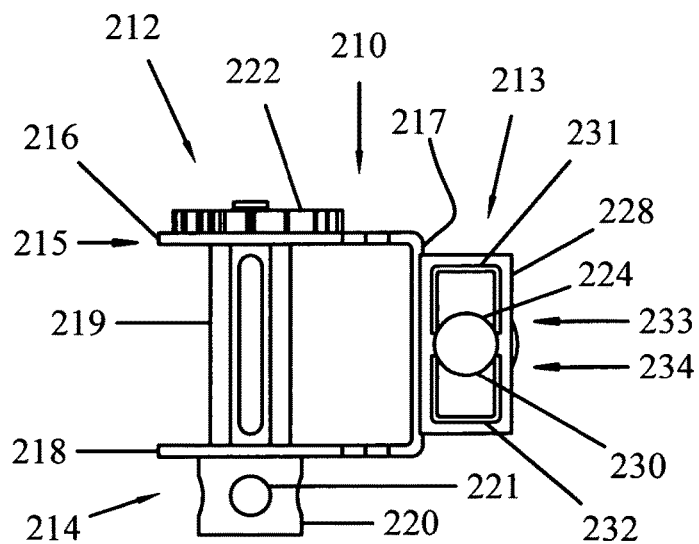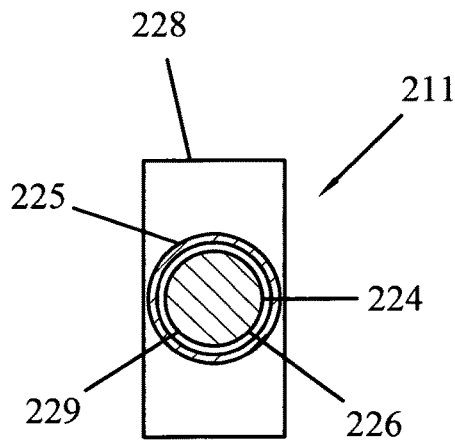
FIG. 15
FIG. 16
FIG. 18
FIG. 17

PIVOTAL TIE-DOWN

CROSS-REFERENCE TO RELATED APPLICATIONS

This application claims the benefit of provisional application No. 62/920,452 filed Apr. 30, 2019, which is incorporated by reference.

BACKGROUND OF THE INVENTION

Field of the Invention

The present invention relates to tie-downs for securing a load on a support surface of a vehicle for when the vehicle is transporting the load.

Background Art

Loads that are transported by vehicles must be secured on or in the vehicle to prevent damage to the load, to the vehicle, and to others due to an unintentional movement of the load relative to the vehicle or partial shifting off of the load from the vehicle or complete dislodgement and falling off of the load from the vehicle during the transporting thereof; and there exist legal requirements to enforce this prevention.

Specifically in the field of transportation, tie-downs are commonly used to so secure loads. However, these tie-downs or components thereof can be readily misplaced. Particularly in the business of equipment rental, auxiliary and supplemental tools such as tie-downs and/or their separate components are too often misplaced, lost, or stolen. Hence, securing the tie-downs themselves would reduce their loss.

Further, some tie-downs can be overly complex. Their deployment and operation to successfully secure a load on a vehicle consumes much time where speedy loading and unloading is a high priority. A tie-down system that reduces the time necessary to fully secure a load on a vehicle would yield faster delivery of the load; and particularly for equipment rental, would increase overall productivity.

Also, greater flexibility of deployment of the tie-downs of a tie-down system would also speed loading and unloading of a load on a transporting vehicle.

SUMMARY OF THE INVENTION

An objective of the present invention is to secure a load on a support surface of a vehicle for transporting the load by the vehicle.

Another objective is to quickly so secure the load on the support surface of the transporting vehicle.

Another objective is to selectively mount any number of tie-downs to so secure the load as is necessary.

Another objective is to prevent the loss of the tie-downs from the transporting vehicle.

Another objective is to have less waste of production material of the manufacturing of tie-downs.

These and further objectives are met by the present invention, which is contemplated to encompass the subject matter as claimed herein, that has been described and also shown in the accompanying drawings, and the equivalents that are consonant therewith.

The present invention comprises a tie-down, a pivot, and a vehicle for transporting a load comprising a plurality of the tie-downs. The tie-down comprises the pivot, a winch, and an anchor.

The pivot comprises a pin, and a rotatable sleeve on the pin. In one embodiment, the pin is a generally solid bar, and the pivot further comprises a cap on the first end of the bar, and a base on the second end of the bar. In another embodiment, the pin is a generally solid bar, and the pivot further comprises a cap on the first end of the bar, and a base having an aperture with the bar in the aperture and the base on the bar between the first and second ends of the bar. In another embodiment, the pin is a generally annular tube, and the pivot further comprises a cap on the first end of the tube, and a base on the second end of the tube.

The winch is attached to the sleeve of the pivot. The winch comprises a U-shaped frame comprising two flanges and a wall interconnecting the flanges, and a spindle rotatably mounted on the flanges. The wall is parallel with and attached to the sleeve.

The anchor is attached to the base of the pivot. In one embodiment, the anchor is a generally solid bar. In another embodiment, the anchor is C-shaped. In another embodiment, the anchor comprises two generally C-shaped channels parallel with each other and a part of the pin, when the base of the pivot has an aperture, that is between the base and the second end of the pivot, wherein the channels sandwich that part of the pin. In another embodiment, the anchor is annular.

In one embodiment, the base of the pivot has a minimum transverse dimension, and the anchor has a maximum transverse dimension, wherein the minimum transverse dimension is greater than the maximum transverse dimension. In another embodiment, the base of the pivot has transverse dimensions comprising a width and a length greater than the width, and the anchor has transverse dimensions comprising a first width and a second width greater than the first width, wherein the width of the base is greater than the first width and the length is greater than the second width.

In another embodiment, the base of the pivot comprises a plate having sides that are unequal in length.

The vehicle comprises a support surface for supporting the load when the vehicle is transporting the load, and the plurality of the tie-downs for securing the load on the support surface for when the vehicle is transporting the load. In one embodiment, when the anchor is a generally solid bar, the bar of the anchor is attached to the support surface. In another embodiment, the vehicle further comprises stake pockets adjacent to the support surface, and the anchor is removably mountable within one respective stake pocket for selectively mounting that respective tie-down on the vehicle for securing the load on the support surface for when the vehicle is transporting the load. In another embodiment, the anchor comprises a set of locking holes.

BRIEF DESCRIPTION OF THE DRAWINGS

FIG. 15 is a side view of the embodiment of the present invention, as shown in FIG. 13.

FIG. 16 is a cross-sectional view taken on line 16-16 in FIG. 15.

FIG. 17 is a cross-sectional view taken on line 17-17 in FIG. 15.

FIG. 18 is a bottom view of the embodiment of the present invention, as shown in FIG. 13.

DETAILED DESCRIPTION OF THE INVENTION

Figure 2:
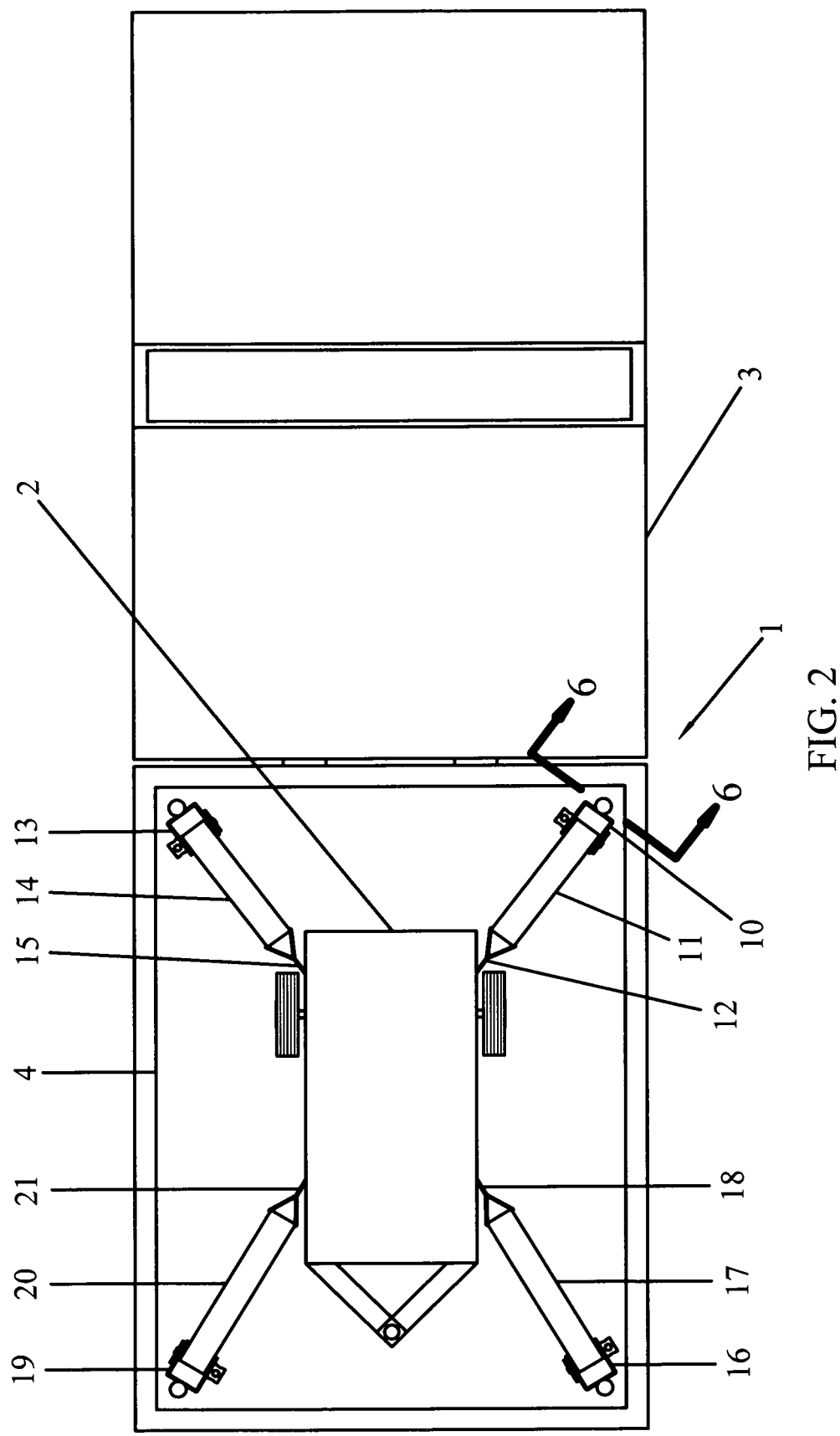
FIG. 2 is a top view of the embodiment of the present invention, as shown in FIG. 1, wherein a plurality thereof are attached on a cargo bed of a truck securing a load thereon.

The present invention secures a load 2 to a vehicle 3 that is for transporting the load 2 as shown in FIG. 2. The vehicle 3 has a support surface 4 for supporting the load 2 when the vehicle 3 is transporting the load 2. Although the vehicle 3 in FIG. 2 is shown specifically as a truck, the present invention is contemplated to be used on any vehicle, such as a truck, a trailer, etc., capable of transporting a load comprising one or more objects that is to be secured onto a support surface of the vehicle to prevent the load from unintentionally moving relative to the support surface during the transporting thereof.

One embodiment of the present invention is shown in FIG. 2 as, generally, a tie-down system 1. The tie-down system 1 comprises a plurality of tie-downs 10, 13, 16, and 19 that secure the load 2 to the support surface 4 of the vehicle 3. Each tie-down 10, 13, 16, and 19 includes a strap 11, 14, 17, and 20 and an attachment 12, 15, 18, and 21, as a hook, respectively. The straps 11, 14, 17, and 20 and the attachments 12, 15, 18, and 21 are known in the art. The tie-downs 10, 13, 16, and 19 engage the load 2, as by directly connecting the attachments 12, 15, 18, and 21 to the load 2 as shown in FIG. 2, and then secure the load 2 on the support surface 4 by tightening the straps 11, 14, 17, and 20 with the tie-downs 10, 13, 16, and 19.

The tie-downs 10, 13, 16, and 19 are identical with each other; and, as such, the tie-down 10 is typical. The tie-down 10 is shown in greater detail in FIG. 1 and FIG. 3, FIG. 4, FIG. 5, and FIG. 6.

The tie-down 10 has a pivot 22, a winch 23, and an anchor 24. The pivot 22, the winch 23, and the anchor 24 are each made of suitable structural material, as metal. The winch 23 may be a hand winch 25 as shown. The winch 23 has a generally U-shaped frame 26. The U-shaped frame 26 has two flanges 27 and 29 extending generally perpendicularly from a wall 28 that interconnects the flanges 27 and 29 at proximal ends thereof, thus defining the U shape. The two flanges 27 and 29 have distal ends opposite from both the proximal ends and the wall 28.

Figure 3:
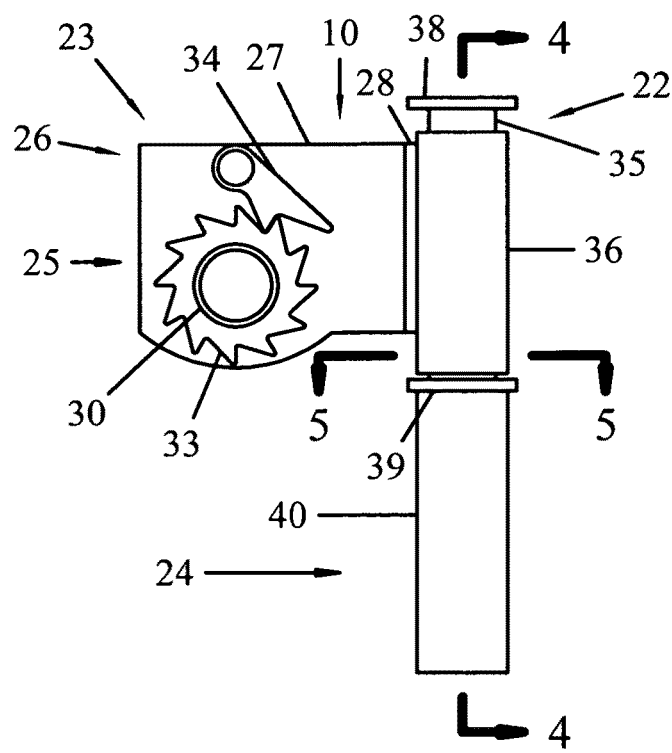
FIG. 3 is a side view of the embodiment of the present invention, as shown in FIG. 1.

Each flange 27 and 29 has an aperture therein. Rotatably mounted within the apertures is a spindle 30 having first and second ends extending beyond the outer surfaces of the flanges 29 and 27. The strap 11 is removably attachable to the spindle 30, as by engagement slots in the spindle 30, so as to be wound and unwound on the spindle 30. Shown as the hand winch 25, the first end of the spindle 30 has a crank 31 attached thereto, as by welding, adjacent to the outer surface of the flange 29. The crank 31 and the first end of the spindle 30 have engagement holes 32 for receiving a hand tool (not shown) for rotating the spindle 30. The second end of the spindle 30 has a ratchet 33 attached thereto, as by welding, adjacent to the outer surface of the flange 27. A pawl 34 is mounted, as on a post, on the outer surface of the flange 27 to swivel between a locking position engaging with the rachet 33 to prevent the ratchet 33 and the spindle 30 from unwinding, and as shown in FIG. 3 in the counter-clockwise direction relative to the ratchet 33, and an open position whereby the ratchet 33 and the spindle 30 may rotate freely in either direction.

Figure 4:
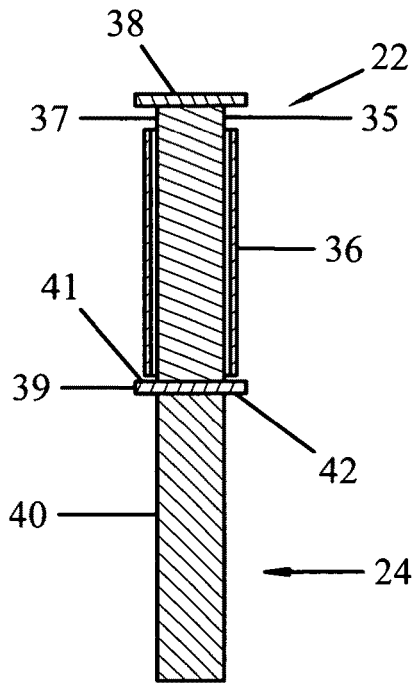
FIG. 4 is a cross-sectional view taken on line 4-4 in FIG. 3.
Figure 6:
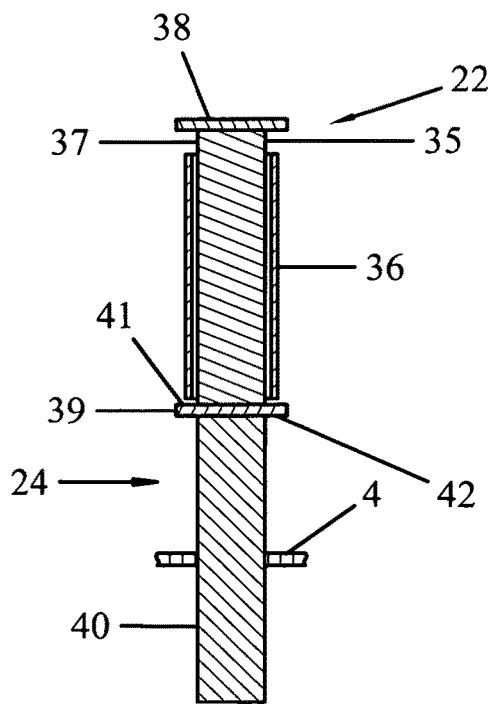
FIG. 6 is a cross-sectional view, partly broken, taken on line 6-6 in FIG. 2.
Figure 5:
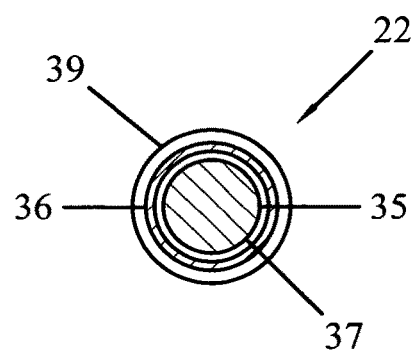
FIG. 5 is a cross-sectional view taken on line 5-5 in FIG. 3.

The pivot 22 has a pin 35 and a generally annular sleeve 36 rotatably mounted on the pin 35. The pin 35 is a generally solid bar 37. As shown in especially FIG. 4, the bar 37 is longer than the rotatable sleeve 36, and has first and second ends. The length of the bar 37 is defined between the first and second ends of the bar 37, and spaces the second end of the bar 37 from the first end of the bar 37. The rotatable sleeve 36 has first and second ends, and first and second surfaces. The length of the rotatable sleeve 36 is defined between the first and second ends of the rotatable sleeve 36, and spaces the second end of the rotatable sleeve 36 from the first end of the rotatable sleeve 36. The rotatable sleeve 36 also has a thickness defined between the first and second surfaces of the rotatable sleeve 36. The thickness of the rotatable sleeve 36 spaces the second surface of the rotatable sleeve 36 from the first surface of the rotatable sleeve 36. The rotatable sleeve 36 has a dimension, transverse to the length of the rotatable sleeve 36, extending through the centroid of the second surface of the rotatable sleeve 36 that is a diameter as shown. The bar 37 is adjacent to the first surface of the rotatable sleeve 36 as shown in FIG. 4, FIG. 5, and FIG. 6.

A cap 38, as a first cap, is attached, as by welding, to the bar 37 on the first end thereof, and a base 39, as a second cap, is attached, as by welding, to the bar 37 on the second end thereof. The cap 38 and the base 39 are plates. The plate of the cap 38 has a dimension transverse, with respect to the length of the bar 37, extending through the center of the plate that is a diameter when the plate is circular as shown. The plate of the base 39 has two side surfaces, a first surface 41 and a second surface 42, that are opposite. The plate of the base 39 also has a thickness defined between the first surface 41 and the second surface 42 that spaces the second surface 42 from the first surface 41. The plate of the base 39 also has a perimeter around the outer edge of the plate of the base 39. The plate of the base 39 has a dimension transverse, with respect to the length of the bar 37, extending through the center of the plate that is a diameter when the plate is circular as shown.

The rotatable sleeve 36 is on the pin 35 in between the cap 38 and the first surface 41 of the base 39. The transverse dimensions of the rotatable sleeve 36 and of the plates of the cap 38 and of the base 39 are aligned with each other. The transverse dimensions of the plates of the cap 38 and of the base 39 are a minimum, and the transverse dimension of the rotatable sleeve 36 is a maximum, such that each minimum transverse dimension is equal to or greater than the maximum transverse dimension, of the rotatable sleeve 36, thereby capturing the rotatable sleeve 36 onto the pin 35 for the rotatable sleeve 36 to freely rotate on the pin 35 about an axis of rotation of the pivot 22. The axis of rotation is aligned with the lengths of both the pin 35 and the rotatable sleeve 36. The first and second surfaces of the the rotatable sleeve 36 are each aligned with the axis of rotation.

Figure 1:
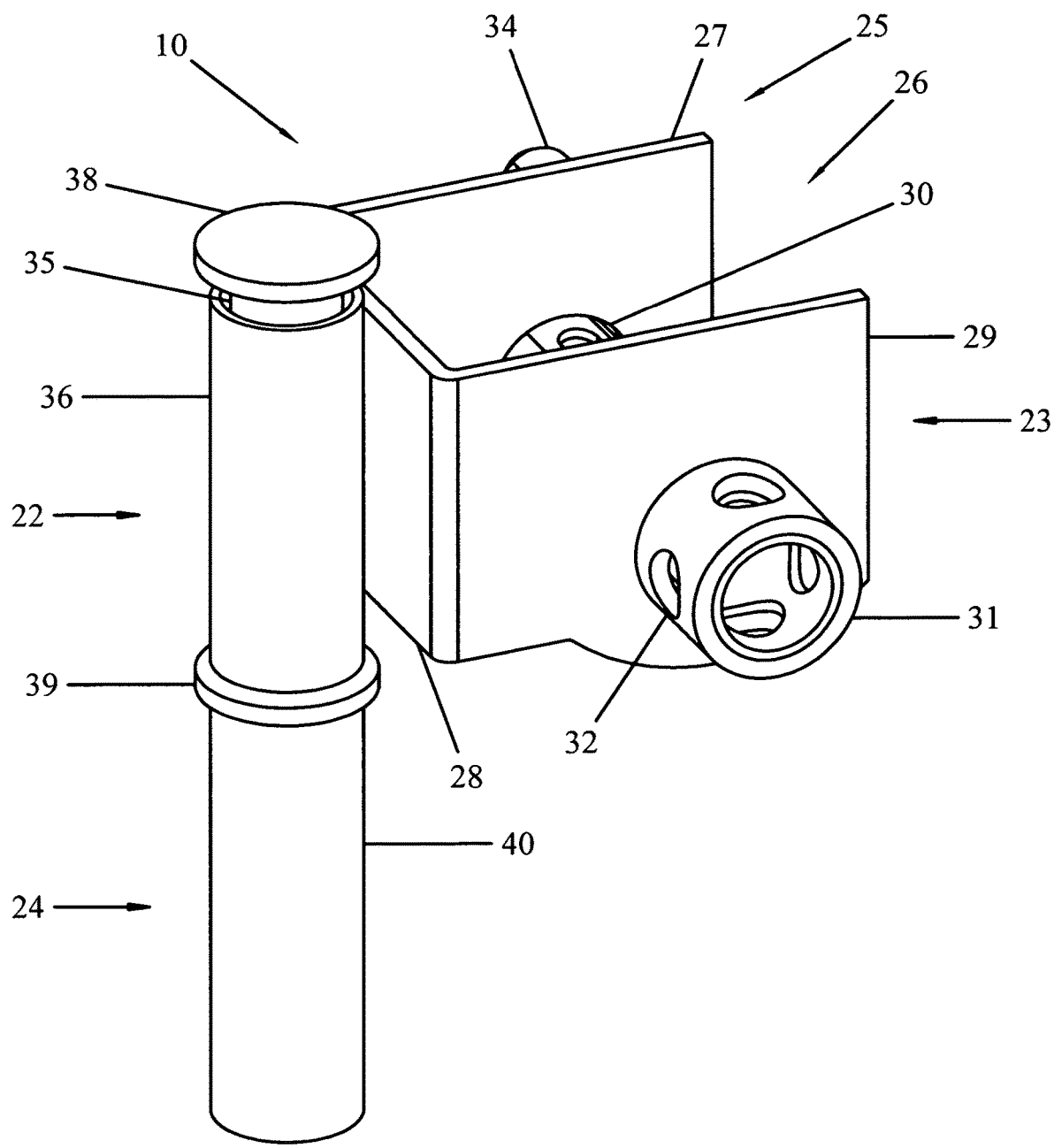
FIG. 1 is a perspective view of one embodiment of the present invention comprising a pivot, a winch, and an anchor.

The wall 28 of the winch 23 is attached to the second surface of the rotatable sleeve 36 as shown in FIG.1 and FIG. 3, as by welding, thus permitting the winch 23 of the tie-down 10 to be pivotal about the axis of rotation of the rotatable sleeve 36 of the pivot 22. The wall 28 is parallel with the rotatable sleeve 36, in that the wall 28 is adjacent to the rotatable sleeve 36 with the proximal ends of the flanges 27 and 29 that are interconnected by the wall 28 being relatively close to the rotatable sleeve 36 and the distal ends of the flanges 27 and 29 being oppositely and relatively far from the rotatable sleeve 36. Thus, the U-shaped frame 26 has the U shape thereof opening radially outwardly away from the axis of rotation of the rotatable sleeve 36 as shown in FIG. 1.

The anchor 24 is a generally solid bar 40 made of suitable structural material, as metal. The bar 40 has first and second ends, and a length defined between the ends of the bar 40 that spaces the second end of the bar 40 from the first end of the bar 40. The bar 40 has a dimension transverse to the length of the bar 40, that is a diameter as shown in FIG. 6, and in particular at the first end of the bar 40. The second surface 42 of the base 39 has a dimension parallel with the transverse dimension of the plate of the base 39 that is transverse to the thickness of the plate of the base 39 and that extends through the center of the second surface 42 and that intersects the outer perimeter of the plate of the base 39 at the second surface 42. The transverse dimension of the second surface 42 is a diameter when the plate of the base 39 is circular as shown. The transverse dimensions of the bar 40 and of the second surface 42 are aligned with each other. The transverse dimesion of the second surface 42 is a minimum, and the transverse dimension at the first end of the bar 40 is a maximum, such that the minimum transverse dimension of the second surface of the base 39 is greater than the maximum transverse dimension of the bar 40 of the anchor 24.

The second end of the bar 37 of the pivot 22 is attached, as by welding, to the one side surface 41 of the base 39 and the first end of the bar 40 of the anchor 24 is attached, as by welding, to the other, opposite side surface 42 of the base 39. Thus, the bar 37 of the pivot 22, from the second end of the bar 37 to the first end of the bar 37, and the bar 40 of the anchor 24, from the first end of the bar 40 to the second end of the bar 40, extend in opposite directions as shown in especially FIG. 4. The bar 40 of the anchor 24 is then attached to the support surface 4, as by welding, preferably through an aperture in the support surface 4 as shown in FIG. 6. The bar 40 of the anchor 24 may be located through the aperture of the support surface 4 anywhere along the length of the bar 40, and preferably at approximately midway between the ends of the bar 40 as shown in FIG. 6. The anchor 24 attaches the tie-down 10 to the vehicle 3 so that the axis of rotation of the rotatable sleeve 36 is generally perpendicular to the support surface 4 to angularly position the winch 23 by pivoting the winch 23 to any plane angle about the axis of rotation relative to the support surface 4, and preferably, when the axis of rotation is generally vertical, that the winch 23 is pivotal to any angle horizontally.

In use, either before or after the load 2 is placed on the support surface 4 of the vehicle 3 for transporting the load 2, the strap 11 is connected to and wound on the spindle 30, as is known in the art. Then, keeping the pawl 34 in its open position, the end of the strap 11 with the attachment 12 is pulled out and away from the tie-down 10, allowing the rotatable sleeve 36 of the pivot 22 to freely rotate to angularly position the winch 23. The attachment 12 is then attached to the desired location on the load 2 when the load 2 is on the support surface 4. The rotatable sleeve 36 thus rotates such that the strap 11 is automatically straight out from the spindle 30 of the winch 23 and perpendicular thereto, as being generally perpendicular by perspective with respect to the wall 28, so as to generate a force that is likewise perpendicular for securing the load 2 to the vehicle 3 through the tie-down 10.

Subsequently, the pawl 34 is swivelled to its locking position, and the hand tool is inserted (not shown) into the engagement holes 32 of the crank 31 to rotate the spindle 30 to rewind the strap 11 onto the spindle 30, the pawl 34 engaging the ratchet 33 and keeping the spindle 30 from unwinding the strap 11 therefrom, thereby tightening the strap 11 to secure the load 2 onto the support surface 4 of the vehicle 3 to prevent the load 2 from unintentionally moving relative to the support surface 4 during the transporting thereof. Typically, a plurality of the tie-downs, although not necessarily all of the tie-downs, of the tie-down system 1 are used, as the tie-downs 10, 13, 16, and 19 as shown in FIG. 2, to secure the load 2, with the straps 11, 14, 17, and 20 thereof being tightened progressively sequentially until the load 2 is fully secured, so as to meet, for example, force limits, legal requirements, etc. necessary for the transporting of the load 2. The tie-down system 1 thus quickly secures the load 2 to the vehicle 3.

Figure 8:
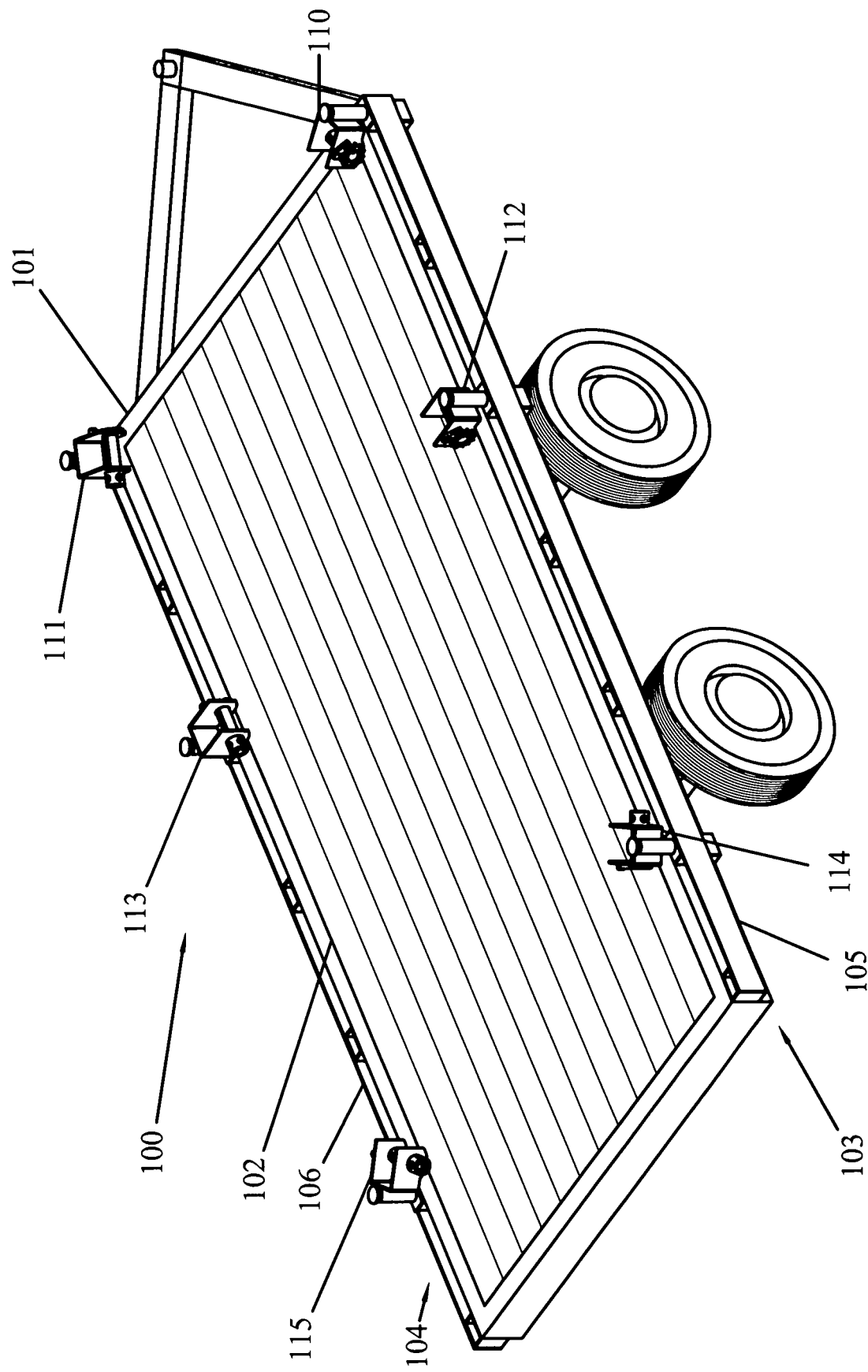
FIG. 8 is a perspective view of the embodiment of the present invention, as shown in FIG. 7, wherein a plurality thereof are removably mounted on a cargo bed of a trailer.

Another embodiment of the present invention is shown in FIG. 8 as, generally, tie-down system 100. The tie-down system 100 is for securing a load, which may be similar to that shown in FIG. 2, to a vehicle 101 that is for transporting identically the load as shown in FIG. 2. The vehicle 101 has a support surface 102 for supporting the load when the vehicle 101 is transporting the load. The vehicle 101 further has sets 103 and 104 of spaced-apart stake pockets adjacent to the sides of the support surface 102. Side rails 105 and 106 are attached to the sets 103 and 104 of the stake pockets, respectively, spacing the side rails 105 and 106 from the sides of the support surface 102. The sets 103 and 104 of the stake pockets are between the side rails 105 and 106 and the sides of the support surface, respectively. Although the vehicle 101 in FIG. 8 is shown specifically as a trailer, this other embodiment of the present invention is likewise contemplated to be used on any vehicle, such as a truck, a trailer, etc., capable of transporting a load comprising one or more objects that is to be secured onto a support surface of the vehicle to prevent the load from unintentionally moving relative to the support surface during the transporting thereof.

The tie-down system 100 comprises a plurality of tie-downs, as tie-downs 110, 111, 112, 113, 114, and 115, that secure the load to the support surface 102 of the vehicle 101. While six tie-downs 110, 111, 112, 113, 114, and 115 are specifically shown in FIG. 8, this other embodiment of the present invention is contemplated to be used with any number of the tie-downs of the tie-down system 100 so as to secure the load onto the support surface 102 of the vehicle 101 to prevent the load from unintentionally moving relative to the support surface 102 during the transporting thereof. Each tie-down 110, 111, 112, 113, 114, and 115 includes a strap and an attachment, as a hook, respectively, which may be identically as shown in FIG. 2. The straps and the attachments are known in the art. The tie-downs 110, 111, 112, 113, 114, and 115 engage the load, as by directly connecting identically the attachments to the load as shown in FIG. 2, and then secure the load on the support surface 102 by tightening the straps with the tie-downs 110, 111, 112, 113, 114, and 115.

The tie-downs 110, 111, 112, 113, 114, and 115 are identical with each other; and, as such, the tie-down 110 is typical. The tie-down 110 is shown in greater detail in FIG. 7 and FIG. 9, FIG. 10, FIG. 11, and FIG. 12.

The tie-down 110 has a pivot 116, a winch 117, and an anchor 118. The pivot 116, the winch 117, and the anchor 118 are each made of suitable structural material, as metal. The winch 117 may be a hand winch 119 as shown. The winch 117 has a generally U-shaped frame 120. The U-shaped frame 120 has two flanges 121 and 123 extending generally perpendicularly from a wall 122 that interconnects the flanges 121 and 123 at proximal ends thereof, thus defining the U shape. The two flanges 121 and 123 have distal ends opposite from both the proximal ends and the wall 122.

Figure 9:
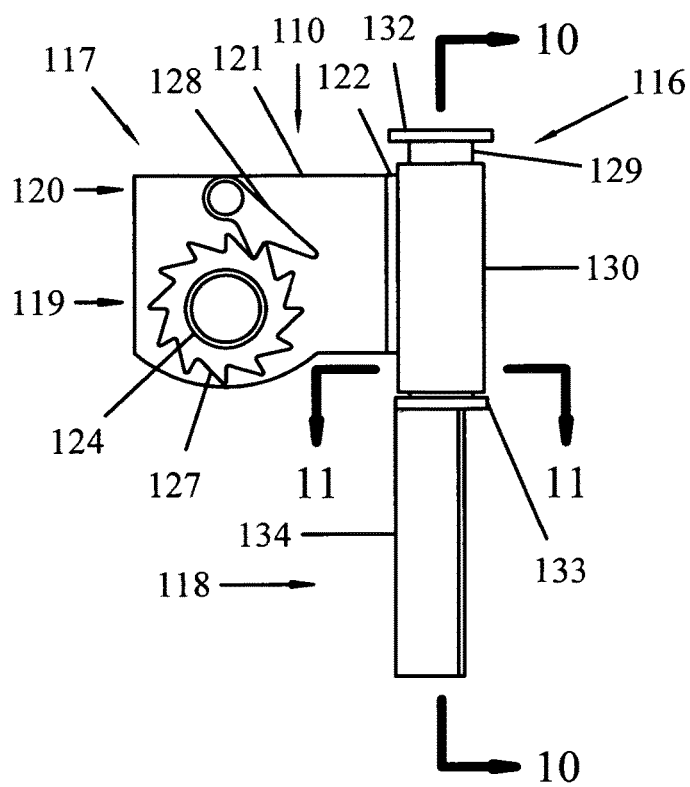
FIG. 9 is a side view of the embodiment of the present invention, as shown in FIG. 7.

Each flange 121 and 123 has an aperture therein. Rotatably mounted within the apertures is a spindle 124 having first and second ends extending beyond the outer surfaces of the flanges 123 and 121. The strap for the tie-down 110 is removably attachable to the spindle 124, as by engagement slots in the spindle 124, so as to be wound and unwound on the spindle 124. Shown as the hand winch 119, the first end of the spindle 124 has a crank 125 attached thereto, as by welding, adjacent to the outer surface of the flange 123. The crank 125 and the first end of the spindle 124 have engagement holes 126 for receiving a hand tool (not shown) for rotating the spindle 124. The second end of the spindle 124 has a ratchet 127 attached thereto, as by welding, adjacent to the outer surface of the flange 121. A pawl 128 is mounted, as on a post, on the outer surface of the flange 121 to swivel between a locking position engaging with the ratchet 127 to prevent the ratchet 127 and the spindle 124 from unwinding, and as shown in FIG. 9 in the counterclockwise direction relative to the ratchet 127, and an open position whereby the ratchet 127 and the spindle 124 may rotate freely in either direction.

Figure 10:
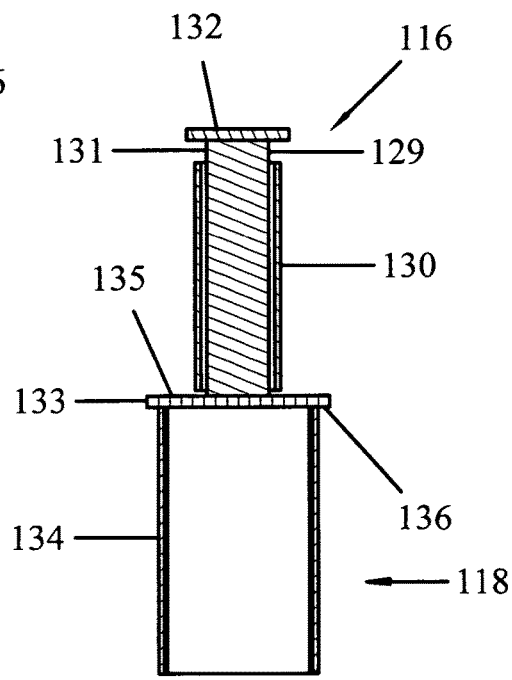
FIG. 10 is a cross-sectional view taken on line 10-10 in FIG. 9.
Figure 11:
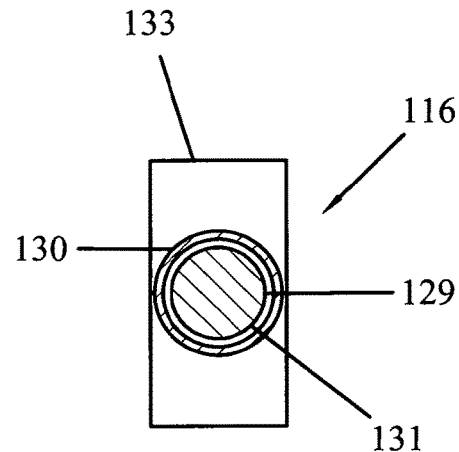
FIG. 11 is a cross-sectional view taken on line 11-11 in FIG. 9.

The pivot 116 has a pin 129 and a generally annular sleeve 130 rotatably mounted on the pin 129. The pin 129 is a generally solid bar 131. As shown in especially FIG. 10, the bar 131 is longer than the rotatable sleeve 130, and has first and second ends. The length of the bar 131 is defined between the first and second ends of the bar 131, and spaces the second end of the bar 131 from the first end of the bar 131. The rotatable sleeve 130 has first and second ends, and first and second surfaces. The length of the rotatable sleeve 130 is defined between the first and second ends of the rotatable sleeve 130, and spaces the second end of the rotatable sleeve 130 from the first end of the rotatable sleeve 130. The rotatable sleeve 130 also has a thickness defined between the first and second surfaces of the rotatable sleeve 130. The thickness of the rotatable sleeve 130 spaces the second surface of the rotatable sleeve 130 from the first surface of the rotatable sleeve 130. The rotatable sleeve 130 has a dimension, transverse to the length of the rotatable sleeve 130, extending through the centroid of the second surface of the rotatable sleeve 130 that is a diameter as shown. The bar 131 is adjacent to the first surface of the rotatable sleeve 130 as shown in FIG. 10 and FIG. 11.

A cap 132, as a first cap, is attached, as by welding, to the bar 131 on the first end thereof, and a base 133, as a second cap, is attached, as by welding, to the bar 131 on the second end thereof. The cap 132 is a plate that has a dimension transverse, with respect to the length of the bar 131, extending through the center of the plate that is a diameter when the plate is circular as shown. The transverse dimension of the plate of the cap 132 is a minimum, and the transverse dimension of the rotatable sleeve 130 is a maximum, such that the minimum transverse dimension is equal to or greater than the maximum transverse dimension. The base 133 is a plate having two side surfaces, a first surface 135 and a second surface 136, that are opposite, and a thickness defined between the first surface 135 and the second surface 136 that spaces the second surface 136 from the first surface 135. The plate of the base 133 also has a perimeter around the outer edge of the plate of the base 133. The plate of the base 133 has dimensions transverse, with respect to the length of the bar 131, extending through the center of the plate that are unequal transverse width and transverse length, greater than the transverse width, as shown in FIG. 7 through FIG. 12. The plate of the base 133 is thus rectangular, with the transverse width and the transverse length thereof defining first and second unequal-length sides of the rectangle of the plate of the base 133.

The rotatable sleeve 130 is on the pin 129 in between the cap 132 and the first surface 135 of the base 133. The transverse dimensions of the rotatable sleeve 130 and of the plate of the cap 132 are aligned with each other. The transverse dimension of the rotatable sleeve 130 and the transverse width of the plate of the base 133 are aligned with each other. The transverse dimensions of the plate of the base 133 are greater than the maximum transverse dimension of the rotatable sleeve 130. The cap 132 and the base 133 thereby capture the rotatable sleeve 130 onto the pin 129 for the rotatable sleeve 130 to freely rotate on the pin 129 about an axis of rotation of the pivot 116. The axis of rotation is aligned with the lengths of both the pin 129 and the rotatable sleeve 130. The first and second surfaces of the rotatable sleeve 130 are each aligned with the axis of rotation.

Figure 7:
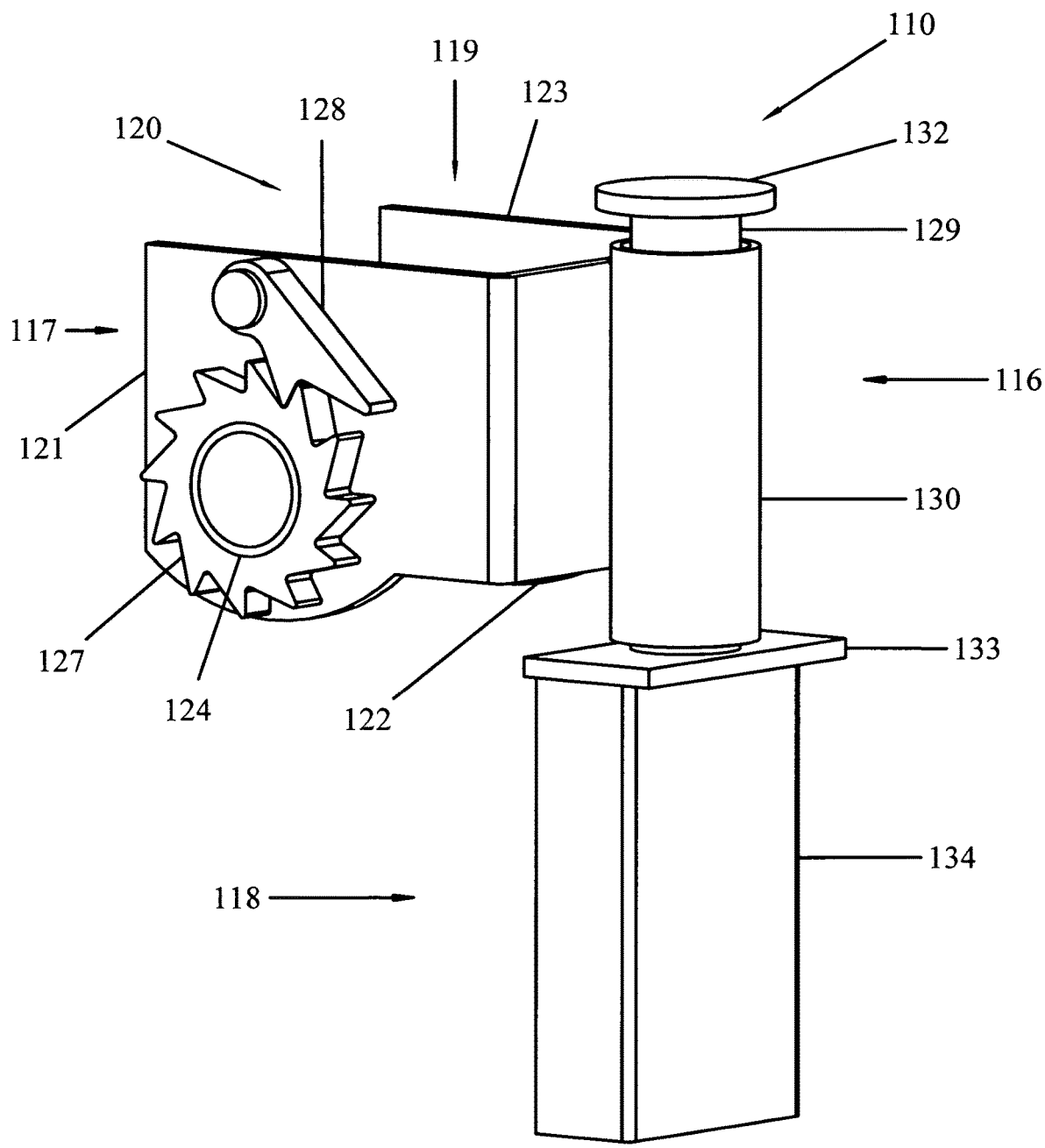
FIG. 7 is a perspective view of another embodiment of the present invention comprising a pivot, a winch, and an anchor.

The wall 122 of the winch 117 is attached to the second surface of the rotatable sleeve 130 as shown in FIG. 7 and FIG. 9, as by welding, thus permitting the winch 117 of the tie-down 110 to be pivotal about the axis of rotation of the rotatable sleeve 130 of the pivot 116. The wall 122 is parallel with the rotatable sleeve 130, in that the wall 122 is adjacent to the rotatable sleeve 130 with the proximal ends of the flanges 121 and 123 that are interconnected by the wall 122 being relatively close to the rotatable sleeve 130 and the distal ends of the flanges 121 and 123 being oppositely and relatively far from the rotatable sleeve 130. Thus, the U-shaped frame 120 has the U shape thereof opening radially outwardly away from the axis of rotation of the rotatable sleeve 130 as shown in FIG. 7.

Figure 12:
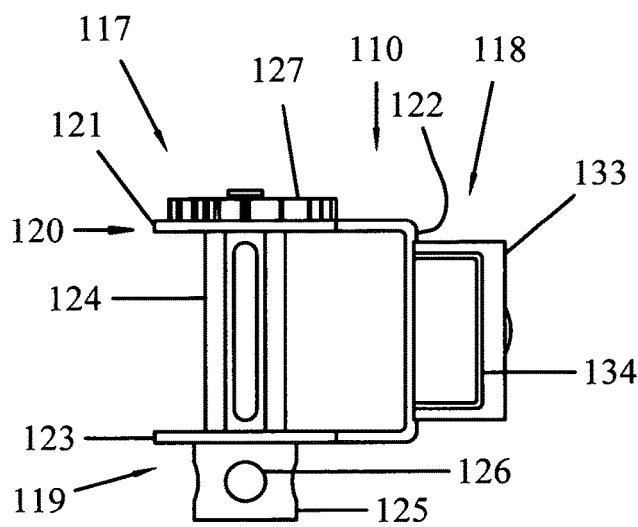
FIG. 12 is a bottom view of the embodiment of the present invention, as shown in FIG. 7.

The anchor 118 is a channel 134 that is transversely cross-sectionally generally C-shaped. The C-shaped channel 134 has inner and outer surfaces, first and second ends, and a length defined between the ends that spaces the second end of the C-shaped channel 134 from the first end of the C-shaped channel 134. The C-shaped channel 134 has dimensions of the C shape, transverse to the length of the C-shaped channel 134 along the length thereof and in particular at the first end of the C-shaped channel 134, that are unequal transverse widths, with a second transverse width of the C shape being greater than a first transverse width of the C shape as shown in FIG. 12. The length and the outer surface of the C-shaped channel 134 are sized and shaped to correspond to any one of the stake pockets of the sets 103 and 104 of stake pockets of the vehicle 101. The length of the C-shaped channel 134 preferably is greater than the depth of any one of the stake pockets of the sets 103 and 104 thereof.

The second surface 136 of the base 133 has dimensions parallel with the transverse width and the transverse length of the plate of the base 133 that are transverse to the thickness of the plate of the base 133 and that extend through the center of the second surface 136 and that intersect the outer perimeter of the plate of the base 133 at the second surface 136. The transverse dimensions of the second surface 136 are unequal transverse width and transverse length, greater than the transverse width of the second surface 136, as shown in FIG. 9, FIG. 10, and FIG. 12. The first transverse width of the C-shaped channel 134 and the transverse width of the second surface 136 are aligned with each other. As shown in FIG. 12, the transverse width of the second surface 136 of the rectangular plate of the base 133 is greater than the first transverse width of the C-shaped channel 134 of the anchor 118. The transverse length of the second surface 136 of the rectangular plate of the base 133 is greater than the second transverse width of the C-shaped channel 134 of the anchor 118.

The second end of the bar 131 of the pivot 116 is attached, as by welding, to the one side surface 135 of the base 133 and the first end of the C-shaped channel 134 of the anchor 118 is attached, as by welding, to the other, opposite side surface 136 of the base 133. Thus, the bar 131 of the pivot 116, from the second end of the bar 131 to the first end of the bar 131, and the C-shaped channel 134 of the anchor 118, from the first end of the C-shaped channel 134 to the second end of the C-shaped channel 134, extend in opposite directions as shown in especially FIG. 10.

The anchor 118 is removably mountable within any one of the stake pockets of the sets 103 and 104 of stake pockets of the vehicle 101, for selectively mounting the tie-down 110 on the vehicle 101 for securing the load on the support surface 102 for when the vehicle 101 is transporting the load, by inserting the second end of the C-shaped channel 134 of the anchor 118 into the stake pocket. The transverse width and the transverse length of the second surface 136 of the rectangular plate of the base 133 is greater than the inner dimensions of any one of the stake pockets of the sets 103 and 104 of stake pockets. The opposite side surface 136 therefore rests on top of the stake pocket into which the anchor 118 of the tie-down 110 is inserted as shown in FIG. 8. The anchor 118 mounts the tie-down 110 to the vehicle 101 so that the axis of rotation of the rotatable sleeve 130 is generally perpendicular to the support surface 102 to angularly position the winch 117 by pivoting the winch 117 to any plane angle about the axis of rotation relative to the support surface 102, and preferably, when the axis of rotation is generally vertical, that the winch 117 is pivotal to any angle horizontally.

In use, either before or after the load is placed on the support surface 102 of the vehicle 101 for transporting the load, one stake pocket is chosen and the tie-down 110 is mounted on the vehicle 101 by inserting the second end of the anchor 118 into the one stake pocket. The tie-down 110 is so inserted until the base 133 rests on top of the one stake pocket as shown in FIG. 8, preventing the tie-down 110 from falling all the way through the one stake pocket. The tie-down 110 so mounted can be easily removed for repositioning the tie-down 110 into a different stake pocket to engage with the load at a different distance and/or angle to secure the load, or can be removed for storage after completion of the transporting of the load by the vehicle 101.

After the tie-down 110 is so mounted, and after the load is placed on the support surface 102 of the vehicle 101 for transporting the load, the strap is connected to and wound on the spindle 124, identically as shown in FIG. 2. Then, keeping the pawl 128 in its open position, the end of the strap with the attachment is pulled out and away from the tie-down 110, allowing the rotatable sleeve 130 of the pivot 116 to freely rotate to angularly position the winch 117. The attachment is then attached, identically as shown in FIG. 2, to the desired location on the load when the load is on the support surface 102. The rotatable sleeve 130 thus rotates such that the strap is automatically straight out from the spindle 124 of the winch 117 and perpendicular thereto, as being generally perpendicular by perspective with respect to the wall 122, so as to generate a force that is likewise perpendicular for securing the load to the vehicle 101 through the tie-down 110.

Subsequently, the pawl 128 is swivelled to its locking position, and the hand tool is inserted (not shown) into the engagement holes 126 of the crank 125 to rotate the spindle 124 to rewind the strap onto the spindle 124, the pawl 128 engaging the ratchet 127 and keeping the spindle 124 from unwinding the strap therefrom, thereby tightening the strap to secure, identically as shown in FIG. 2, the load onto the support surface 102 of the vehicle 101 to prevent the load from unintentionally moving relative to the support surface 102 during the transporting thereof. While the plurality of the six tie-downs 110, 111, 112, 113, 114, and 115 are shown in FIG. 8, in actual use as many or as few of the tie-downs of the tie-down system 100 that are needed are used in order to secure the load, with the straps thereof being tightened progressively sequentially until the load is fully secured, so as to meet, for example, force limits, legal requirements, etc. necessary for the transporting of the load. The tie-down system 100 thus quickly secures the load to the vehicle 101, while also providing for the selectively mounting of any number of the tie-downs of the tie-down system 100 into the sets 103 and 104 of stake pockets.

Figure 14:
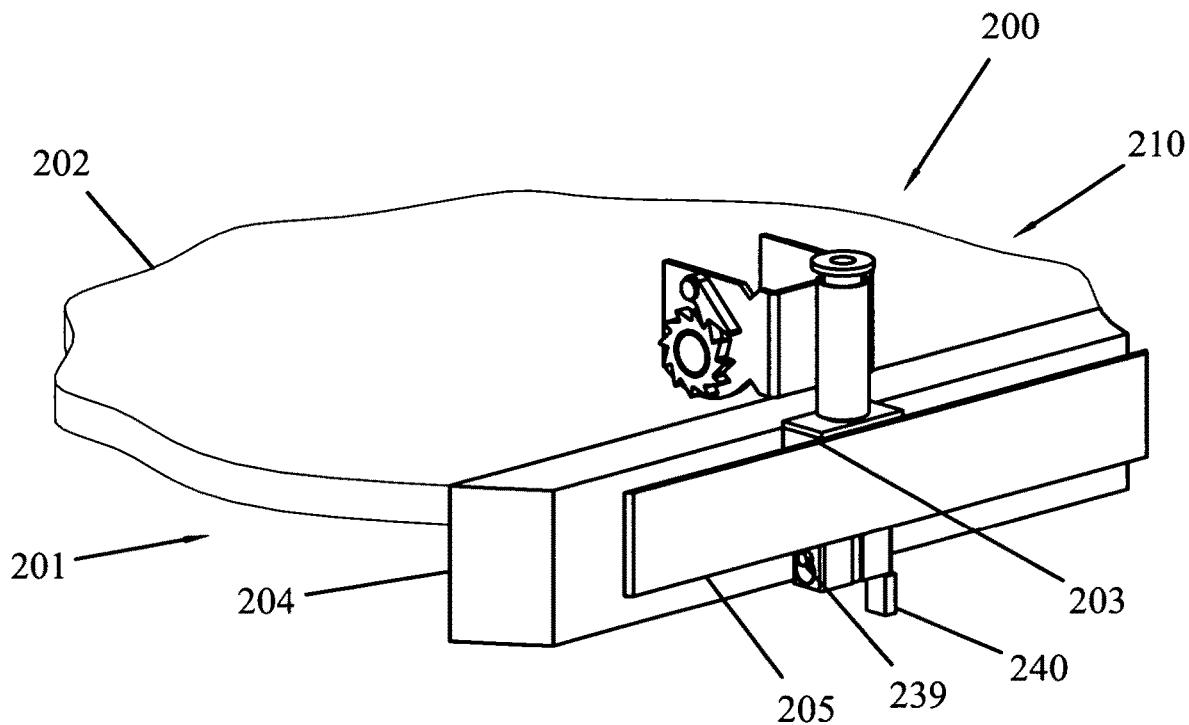
FIG. 14 is a perspective view, partly broken, of the embodiment of the present invention, as shown in FIG. 13, removably mounted in a stake pocket of a vehicle.

Yet another embodiment of the present invention is shown in FIG. 14 as, generally, tie-down system 200. The tie-down system 200 is for securing a load, which may be similar to that shown in FIG. 2, to a vehicle 201 that is for transporting identically the load as shown in FIG. 2. The vehicle 201 has a support surface 202, both of which may be similar to either that shown in FIG. 2 or that shown in FIG. 8, for supporting the load when the vehicle 201 is transporting the load. The vehicle 201 further has sets of spaced-apart stake pockets, one stake pocket 203 thereof being shown in FIG. 14, adjacent to the sides, one side 204 being shown in FIG. 14, of the support surface 202, which may be similar to that shown in FIG. 8. Likewise as similarly shown in FIG. 8, side rails, one side rail 205 being shown in FIG. 14, are attached to the sets of the stake pockets, respectively, spacing the side rails from the sides of the support surface 202. The sets of the stake pockets are between the side rails and the sides of the support surface, respectively. Although FIG. 14 shows a partly broken perspective view of the vehicle 201 with this yet other embodiment of the present invention, this yet other embodiment of the present invention is likewise contemplated to be used on any vehicle, such as a truck, a trailer, etc., capable of transporting a load comprising one or more objects that is to be secured onto a support surface of the vehicle to prevent the load from unintentionally moving relative to the support surface during the transporting thereof.

The tie-down system 200 comprises a plurality of tie-downs, as similarly as the plurality shown in FIG. 8, that secure the load to the support surface 202 of the vehicle 201. This yet other embodiment of the present invention is contemplated to be used with any number of the tie-downs of the tie-down system 200 so as to secure the load onto the support surface 202 of the vehicle 201 to prevent the load from unintentionally moving relative to the support surface 202 during the transporting thereof. Each tie-down includes a strap and an attachment, as a hook, respectively, which may be identically as shown in FIG. 2. The straps and the attachments are known in the art. The tie-downs engage the load, as by directly connecting identically the attachments to the load as shown in FIG. 2, and then secure the load on the support surface 202 by tightening the straps with the tie-downs.

The tie-downs are identical with each other; and, as such, the tie-down 210 is typical. The tie-down 210 is shown in greater detail in FIG. 13 and FIG. 15, FIG. 16, FIG. 17, and FIG. 18.

The tie-down 210 has a pivot 211, a winch 212, and an anchor 213. The pivot 211, the winch 212, and the anchor 213 are each made of suitable structural material, as metal. The winch 212 may be a hand winch 214 as shown. The winch 212 has a generally U-shaped frame 215. The U-shaped frame 215 has two flanges 216 and 218 extending generally perpendicularly from a wall 217 that interconnects the flanges 216 and 218 at proximal ends thereof, thus defining the U shape. The two flanges 216 and 218 have distal ends opposite from both the proximal ends and the wall 217.

Each flange 216 and 218 has an aperture therein. Rotatably mounted within the apertures is a spindle 219 having first and second ends extending beyond the outer surfaces of the flanges 218 and 216. The strap for the tie-down 210 is removably attachable to the spindle 219, as by engagement slots in the spindle 219, so as to be wound and unwound on the spindle 219. Shown as the hand winch 214, the first end of the spindle 219 has a crank 220 attached thereto, as by welding, adjacent to the outer surface of the flange 218. The crank 220 and the first end of the spindle 219 have engagement holes 221 for receiving a hand tool (not shown) for rotating the spindle 219. The second end of the spindle 219 has a ratchet 222 attached thereto, as by welding, adjacent to the outer surface of the flange 216. A pawl 223 is mounted, as on a post, on the outer surface of the flange 216 to swivel between a locking position engaging with the ratchet 222 to prevent the ratchet 222 and the spindle 219 from unwinding, and as shown in FIG. 15 in the counterclockwise direction relative to the ratchet 222, and an open position whereby the ratchet 222 and the spindle 219 may rotate freely in either direction.

The pivot 211 has a pin 224 and a generally annular sleeve 225 rotatably mounted on the pin 224. The pin 224 is a generally solid bar 226. As shown in especialy FIG. 16, the bar 226 is longer than the rotatable sleeve 225, and has first and second ends. The length of the bar 226 is defined between the first and second ends of the bar 226, and spaces the second end of the bar 226 from the first end of the bar 226. The rotatable sleeve 225 has first and second ends, and first and second surfaces. The length of the rotatable sleeve 225 is defined between the first and second ends of the rotatable sleeve 225, and spaces the second end of the rotatable sleeve 225 from the first end of the rotatable sleeve 225. The rotatable sleeve 225 also has a thickness defined between the first and second surfaces of the rotatable sleeve 225. The thickness of the rotatable sleeve 225 spaces the second surface of the rotatable sleeve 225 from the first surface of the rotatable sleeve 225. The rotatable sleeve 225 has a dimension, transverse to the length of the rotatable sleeve 225, extending through the centroid of the second surface of the rotatable sleeve 225 that is a diameter as shown. The bar 226 is adjacent to the first surface of the rotatable sleeve 225 as shown in FIG. 16 and FIG. 17.

A cap 227 is attached, as by welding, to the bar 226 on the first end thereof. A base 228 has an aperture as shown in FIG. 16. The bar 226 is in the aperture, with the base 228 on the bar 226 in between the first end and the second end of the bar 226. The base 228 and the bar 226 are attached, as by welding, to each other at the aperture of the base 228. The pin 224 thus has a first part that is between the first end of the bar 226 and the base 228, and a second part that is between the base 228 and the second end of the bar 226.

The cap 227 is a plate that has a dimension transverse, with respect to the length of the bar 226, extending such that the transverse dimension is a diameter when the plate is circular as shown. The transverse dimension of the plate of the cap 227 is a minimum, and the transverse dimension of the rotatble sleeve 225 is a maximum, such that the minimum transverse dimension is equal to or greater than the maximum transverse dimension. The base 228 is a plate having two side surfaces, a first surface 235 and a second surface 236, that are opposite, and a thickness defined between the first surface 235 and the second surface 236 that spaces the second surface 236 from the first surface 235. The plate of the base 228 also has an outer perimeter around the outer edge of the plate of the base 228, and an inner perimeter around the aperture of the base 228. The pin 224 thus has more particularly a first part 229 that is between the first end of the bar 226 and the first surface 235 of the base 228, and a second part 230 that is between the second surface 236 of the base 228 and the second end of the bar 226.

The plate of the base 228 has dimensions transverse, with respect to the length of the bar 226, extending through the centroid of the plate that are unequal transverse width and transverse length, greater than the transverse width, as shown in FIG. 13 through FIG. 18. The plate of the base 228 is thus rectangular, with the transverse width and the transverse length thereof defining first and second unequal-length sides of the rectangle of the plate of the base 228.

The rotatable sleeve 225 is on the pin 224 in between the cap 227 and the first surface 235 of the base 228. The transverse dimensions of the rotatable sleeve 225 and of the plate of the cap 227 are aligned with each other. The transverse dimension of the rotatable sleeve 225 and the transverse width of the plate of the base 228 are aligned with each other. The transverse dimensions of the plate of the base 228 are greater than the maximum transverse dimension of the rotatable sleeve 225. The cap 227 and the base 228 thereby capture the rotatable sleeve 225 onto the pin 224 for the rotatable sleeve 225 to freely rotate on the pin 224 about an axis of rotation of the pivot 211. The axis of rotation is aligned with the lengths of both the pin 224 and the rotatable sleeve 225. The first and second surfaces of the rotatable sleeve 225 are each aligned with the axis of rotation.

Figure 13:
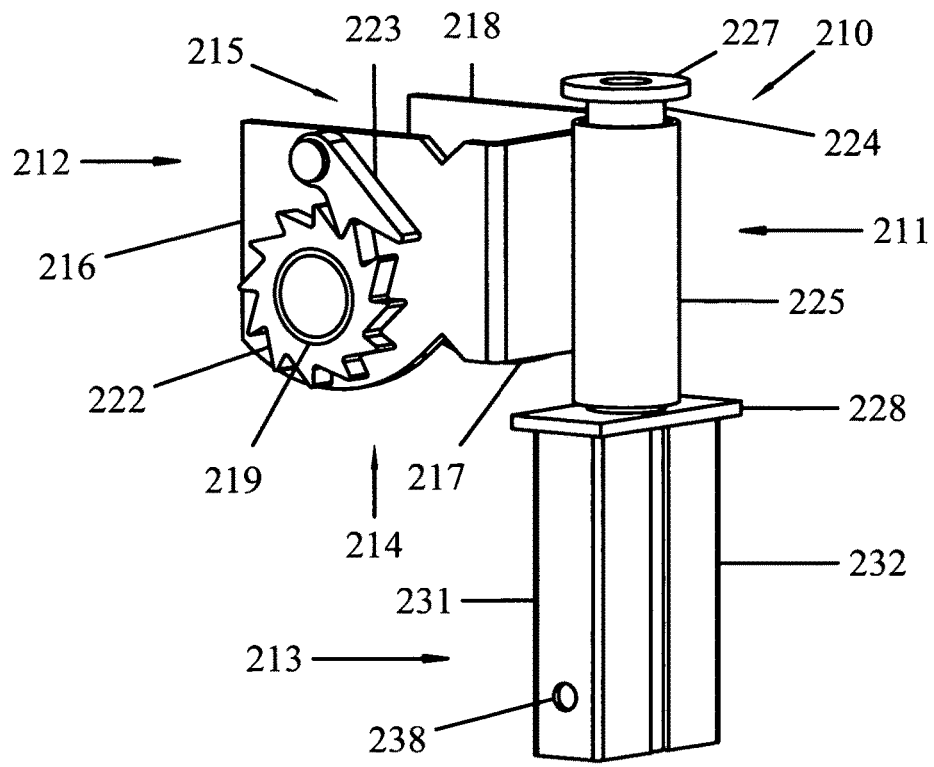
FIG. 13 is a perspective view of another embodiment of the present invention comprising a pivot, a winch, and an anchor.

The wall 217 of the winch 212 is attached to the second surface of the rotatable sleeve 225 as shown in FIG. 13 and FIG. 15, as by welding, thus permitting the winch 212 of the tie-down 210 to be pivotal about the axis of rotation of the rotatable sleeve 225 of the pivot 211. The wall 217 is parallel with the rotatable sleeve 225, in that the wall 217 is adjacent to the rotatable sleeve 225 with the proximal ends of the flanges 216 and 218 that are interconnected by the wall 217 being relatively close to the rotatable sleeve 225 and the distal ends of the flanges 216 and 218 being oppositely and relatively far from the rotatable sleeve 225. Thus, the U-shaped frame 215 has the U shape thereof opening radially outwardly away from the axis of rotation of the rotatable sleeve 225 as shown in FIG. 13.

The anchor 213 has a first channel 231 that is transversely cross-sectionally generally C-shaped, and a second channel 232 that is transversely cross-sectionally generally C-shaped, and the second part 230 of the pin 224 that is between the second surface 236 of the base 228 and the second end of the bar 226. The first C-shaped channel 231 and the second C-shaped channel 232 are parallel with each other and are in between the second surface 236 of the base 228 and the second end of the bar 226 as shown in FIG. 16. As shown in FIG. 16 and FIG. 18, the second part 230 of the pin 224 is in between the first C-shaped channel 231 and the second C-shaped channel 232 with the first C-shaped channel 231 and the second C-shaped channel 232 sandwiching the second part 230 of the pin 224. Each C shape of the channels 231 and 232 face inwardly toward the second part 230 of the pin 224. The distal edges 233 and 234 of each C shape of the channels 231 and 232 are attached, as by welding, to the second part 230 of the pin 224.

The anchor 213 is thus transversely generally rectangular. The anchor 213 has a generally outer surface, first and second ends, and a length defined between the ends that spaces the second end of the anchor 213 from the first end of the anchor 213. The anchor 213 has dimensions, transverse to the length of the anchor 213 along the length thereof and in particular at the first end of the anchor 213, that are unequal transverse widths, with a second transverse width of the anchor 213 being greater than a first transverse width of the anchor 213 as shown in FIG. 18. The length and the outer surface of the anchor 213 are sized and shaped to correspond to any one of the stake pockets of the vehicle 201. The length of the anchor 213 preferably is greater than the depth of any one of the stake pockets of the vehicle 201.

The second surface 236 of the base 228 has dimensions parallel with the transverse width and the transverse length of the plate of the base 228 that are transverse to the thickness of the plate of the base 228 and that extend through the centroid of the second surface 236 and that intersect the outer perimeter of the plate of the base 228 at the second surface 236. The transverse dimensions of the second surface 236 are unequal transverse width and transverse length, greater than the transverse width of the second surface 236, as shown in FIG. 15, FIG. 16, and FIG. 18. The first transverse width of the anchor 213 and the transverse width of the second surface 236 are aligned with each other, and the second transverse width of the anchor 213 and the transverse length of the second surface 236 are aligned with each other. As shown in FIG. 18, the transverse width of the second surface 236 of the rectangular plate of the base 228 is greater than the first transverse width of the anchor 213. The transverse length of the second surface 236 of the rectangular plate of the base 228 is greater than the second transverse width of the anchor 213.

The first end of the anchor 213 is attached, as by welding, to the opposite side surface 236 of the base 228. Thus, the bar 226 of the pivot 211, from the second end of the bar 226 to the first end of the bar 226, and the anchor 213, from the first end of the anchor 213 to the second end of the anchor 213, extend in opposite directions as shown in especially FIG. 16.

The anchor 213 also has a set 237 of locking holes. The set 237 of locking holes form an aperture 238 passing entirely through the second, greater transverse width of the anchor 213 approximately adjacent but spaced from the second end of the anchor 213. A locking pin 239 may be inserted through the aperture 238 to prevent the tie-down 210 from being accidentally removed or dislodged from the stake pocket, as stake pocket 203 as shown in FIG. 14, that the tie-down 210 has been inserted into during the transporting of the load by the vehicle 201. A hitch pin as is commonly available may be used as the locking pin 239. A lock 240, as a keyed padlock or any other conventional lock, also may be located on the locking pin 239 to keep the locking pin 239 in place and therefore keep the tie-down 210 inserted in the stake pocket, as 203, to prevent unauthorized removal of the tie-down 210.

The anchor 213 is removably mountable within any one of the stake pockets of the vehicle 201, for selectively mounting the tie-down 210 on the vehicle 201 for securing the load on the support surface 202 for when the vehicle 201 is transporting the load, by inserting the second end of the anchor 213 into the stake pocket, as 203 as shown in FIG. 14. The transverse width and the transverse length of the second surface 236 of the rectangular plate of the base 228 is greater than the inner dimensions of any one of the stake pockets. The opposite side surface 236 therefore rests on top of the stake pocket into which the anchor 213 of the tie-down 210 is inserted as shown in FIG. 14. The anchor 213 mounts the tie-down 210 to the vehicle 201 so that the axis of rotation of the rotatable sleeve 225 is generally perpendicular to the support surface 202 to angularly position the winch 212 by pivoting the winch 212 to any plane angle about the axis of rotation relative to the support surface 202, and preferably, when the axis of rotation is generally vertical, that the winch 212 is pivotal to any angle horizontally.

In use, either before or after the load is placed on the support surface 202 of the vehicle 201 for transporting the load, one stake pocket 203 is chosen and the tie-down 210 is mounted on the vehicle 201 by inserting the second end of the anchor 213 into the one stake pocket 203. The tie-down 210 is so inserted until the base 228 rests on top of the one stake pocket 203 as shown in FIG. 14, preventing the tie-down 210 from falling all the way through the one stake pocket 203. The tie-down 210 so mounted can be easily removed for repositioning the tie-down 210 into a different stake pocket to engage with the load at a different distance and/or angle to secure the load, or can be removed for storage after completion of the transporting of the load by the vehicle 201. The locking pin 239 may then be inserted into the aperture 238 of the anchor 213, securing the tie-down 210 into the one stake pocket 203. The lock 240 then may also be located on the locking pin 239 to further secure the tie-down 210 so as to prevent unauthorized removal of the tie-down 210.

After the tie-down 210 is so mounted, and after the load is placed on the support surface 202 of the vehicle 201 for transporting the load, the strap is connected to and wound on the spindle 219, identically as shown in FIG. 2. Then, keeping the pawl 223 in its open position, the end of the strap with the attachment is pulled out and away from the tie-down 210, allowing the rotatable sleeve 225 of the pivot 211 to freely rotate to angularly position the winch 212. The attachment is then attached, identically as shown in FIG. 2, to the desired location on the load when the load is on the support surface 202. The rotatable sleeve 225 thus rotates such that the strap is automatically straight out from the spindle 219 of the winch 212 and perpendicular thereto, as being generally perpendicular by perspective with respect to the wall 217, so as to generate a force that is likewise perpendicular for securing the load to the vehicle 201 through the tie-down 210.

Subsequently, the pawl 223 is swivelled to its locking position, and the hand tool is inserted (not shown) into the engagement holes 221 of the crank 220 to rotate the spindle 219 to rewind the strap onto the spindle 219, the pawl 223 engaging the ratchet 222 and keeping the spindle 219 from unwinding the strap therefrom, thereby tightening the strap to secure, identically as shown in FIG. 2, the load onto the support surface 202 of the vehicle 201 to prevent the load from unintentionally moving relative to the support surface 202 during the transporting thereof. In actual use as many or as few of the tie-downs of the tie-down system 200 that are needed are used in order to secure the load, with the straps thereof being tightened progressively sequentially until the load is fully secured, so as to meet, for example, force limits, legal requirements, etc. necessary for the transporting of the load. The tie-down system 200 thus quickly secures the load to the vehicle 201, while also providing for the selectively mounting of any number of the tie-downs of the tie-down system 200 into the stake pockets of the vehicle 201, and also providing security to the tie-downs of the tie-down system 200 from unauthorized removal.

Figure 20:
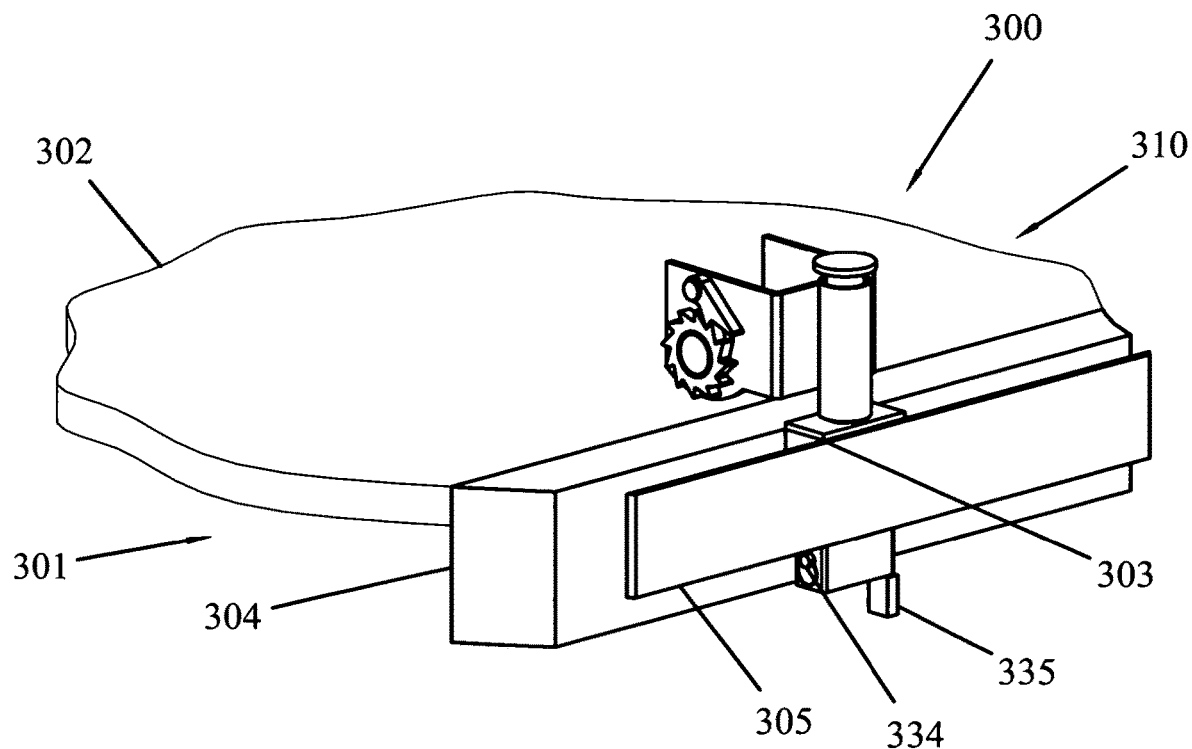
FIG. 20 is a perspective view, partly broken, of the embodiment of the present invention, as shown in FIG. 19, removably mounted in a stake pocket of a vehicle.

Still yet another embodiment of the present invention is shown in FIG. 20 as, generally, tie-down system 300. The tie-down system 300 is for securing a load, which may be similar to that shown in FIG. 2, to a vehicle 301 that is for transporting identically the load as shown in FIG. 2. The vehicle 301 has a support surface 302, both of which may be similar to either that shown in FIG. 2 or that shown in FIG. 8, for supporting the load when the vehicle 301 is transporting the load. The vehicle 301 further has sets of spaced-apart stake pockets, one stake pocket 303 thereof being shown in FIG. 20, adjacent to the sides, one side 304 being shown in FIG. 20, of the support surface 302, which may be similar to that shown in FIG. 8. Likewise as similarly shown in FIG. 8, side rails, one side rail 305 being shown in FIG. 20, are attached to the sets of the stake pockets, respectively, spacing the side rails from the sides of the support surface 302. The sets of the stake pockets are between the side rails and the sides of the support surface, respectively. Although FIG. 20 shows a partly broken perspective view of the vehicle 301 with this still yet other embodiment of the present invention, this still yet other embodiment of the present invention is likewise contemplated to be used on any vehicle, such as a truck, a trailer, etc., capable of transporting a load comprising one or more objects that is to be secured onto a support surface of the vehicle to prevent the load from unintentionally moving relative to the support surface during the transporting thereof.

The tie-down system 300 comprises a plurality of tie-downs, as similarly as the plurality shown in FIG. 8, that secure the load to the support surface 302 of the vehicle 301. This still yet other embodiment of the present invention is contemplated to be used with any number of the tie-downs of the tie-down system 300 so as to secure the load onto the support surface 302 of the vehicle 301 to prevent the load from unintentionally moving relative to the support surface 302 during the transporting thereof. Each tie-down includes a strap and an attachment, as a hook, respectively, which may be identically as shown in FIG. 2. The straps and the attachments are known in the art. The tie-downs engage the load, as by directly connecting identically the attachments to the load as shown in FIG. 2, and then secure the load on the support surface 302 by tightening the straps with the tie-downs.

The tie-downs are identical with each other; and, as such, the tie-down 310 is typical. The tie-down 310 is shown in greater detail in FIG. 19 and FIG. 21, FIG. 22, FIG. 23, and FIG. 24.

The tie-down 310 has a pivot 311, a winch 312, and an anchor 313. The pivot 311, the winch 312, and the anchor 313 are each made of suitable structural material, as metal. The winch 312 may be a hand winch 314 as shown. The winch 312 has a generally U-shaped frame 315. The U-shaped frame 315 has two flanges 316 and 318 extending generally perpendicularly from a wall 317 that interconnects the flanges 316 and 318 at proximal ends thereof, thus defining the U shape. The two flanges 316 and 318 have distal ends opposite from both the proximal ends and the wall 317.

Figure 21:
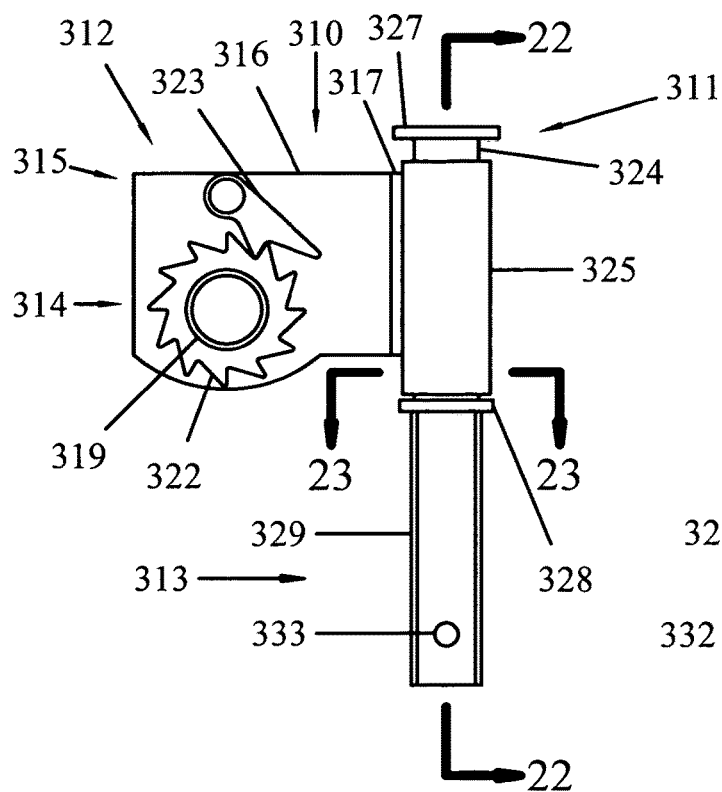
FIG. 21 is a side view of the embodiment of the present invention, as shown in FIG. 19.

Each flange 316 and 318 has an aperture therein. Rotatably mounted within the apertures is a spindle 319 having first and second ends extending beyond the outer surfaces of the flanges 318 and 316. The strap for the tie-down 310 is removably attachable to the spindle 319, as by engagement slots in the spindle 319, so as to be wound and unwound on the spindle 319. Shown as the hand winch 314, the first end of the spindle 319 has a crank 320 attached thereto, as by welding, adjacent to the outer surface of the flange 318. The crank 320 and the first end of the spindle 319 have engagement holes 321 for receiving a hand tool (not shown) for rotating the spindle 319. The second end of the spindle 319 has a ratchet 322 attached thereto, as by welding, adjacent to the outer surface of the flange 316. A pawl 323 is mounted, as on a post, on the outer surface of the flange 316 to swivel between a locking position engaging with the ratchet 322 to prevent the ratchet 322 and the spindle 319 from unwinding, and as shown in FIG. 21 in the counterclockwise direction relative to the ratchet 322, and an open position whereby the ratchet 322 and the spindle 319 may rotate freely in either direction.

Figure 22:
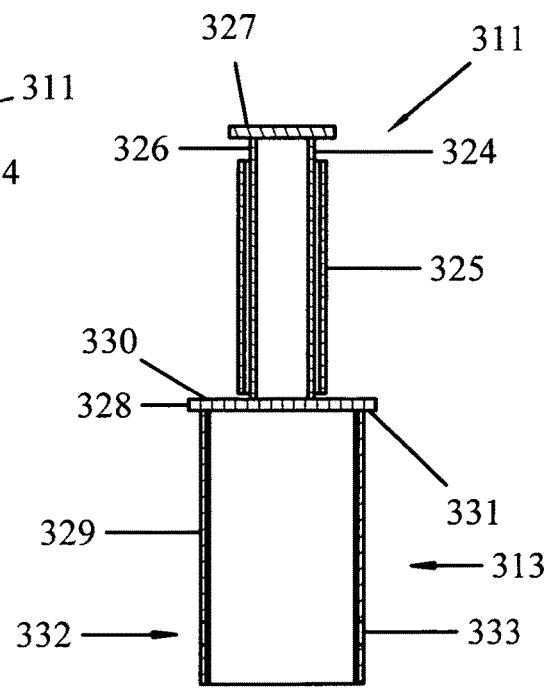
FIG. 22 is a cross-sectional view taken on line 22-22 in FIG. 21.
Figure 23:
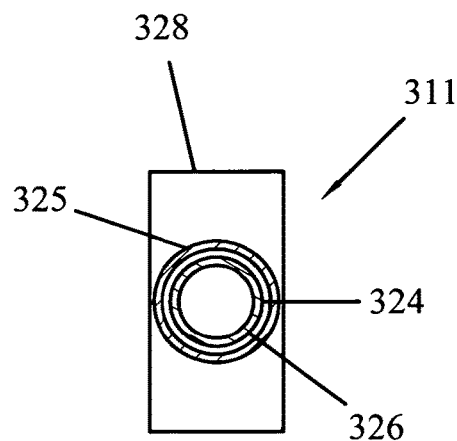
FIG. 23 is a cross-sectional view taken on line 23-23 in FIG. 21.

The pivot 311 has a pin 324 and a generally circularly annular sleeve 325 rotatably mounted on the pin 324. The pin 324 is a generally circularly annular tube 326. As shown in especially FIG. 22, the annular tube 326 is longer than the rotatable sleeve 325, and has first and second ends. The length of the annular tube 326 is defined between the first and second ends of the annular tube 326, and spaces the second end of the annular tube 326 from the first end of the annular tube 326. The rotatable sleeve 325 has first and second ends, and first and second surfaces. The length of the rotatable sleeve 325 is defined between the first and second ends of the rotatable sleeve 325, and spaces the second end of the rotatable sleeve 325 from the first end of the rotatable sleeve 325. The rotatable sleeve 325 also has a thickness defined between the first and second surfaces of the rotatable sleeve 325. The thickness of the rotatable sleeve 325 spaces the second surface of the rotatable sleeve 325 from the first surface of the rotatable sleeve 325. The rotatable sleeve 325 has a dimension, transverse to the length of the rotatable sleeve 325, extending through the centroid of the second surface of the rotatable sleeve 325 that is a diameter as shown. The annular tube 326 is adjacent to the first surface of the rotatable sleeve 325 as shown in FIG. 22 and FIG. 23.

A cap 327, as a first cap, is attached, as by welding, to the annular tube 326 on the first end thereof, and a base 328, as a second cap, is attached, as by welding, to the annular tube 326 on the second end thereof. The cap 327 is a plate that has a dimension transverse, with respect to the length of the annular tube 326, extending through the center of the plate that is a diameter when the plate is circular as shown. The transverse dimension of the plate of the cap 327 is a minimum, and the transverse dimension of the rotatable sleeve 325 is a maximum, such that the minimum transverse dimension is equal to or greater than the maximum transverse dimension. The base 328 is a plate having two side surfaces, a first surface 330 and a second surface 331, that are opposite, and a thickness defined between the first surface 330 and the second surface 331 that spaces the second surface 331 from the first surface 330. The plate of the base 328 also has a perimeter around the outer edge of the plate of the base 328. The plate of the base 328 has dimensions transverse, with respect to the length of the annular tube 326, extending through the center of the plate that are unequal transverse width and transverse length, greater than the transverse width, as shown in FIG. 19 through FIG. 24. The plate of the base 328 is thus rectangular, with the transverse width and the transverse length thereof defining first and second unequal-length sides of the rectangle of the plate of the base 328.

The rotatable sleeve 325 is on the pin 324 in between the cap 327 and the first surface 330 of the base 328. The transverse dimensions of the rotatable sleeve 325 and of the plate of the cap 327 are aligned with each other. The transverse dimensions of the plate of the base 328 are greater than the maximum transverse dimension of the rotatable sleeve 325. The cap 327 and the base 328 thereby capture the rotatable sleeve 325 onto the pin 324 for the rotatable sleeve 325 to freely rotate on the pin 324 about an axis of rotation of the pivot 311. The axis of rotation is aligned with the lengths of both the pin 324 and the rotatable sleeve 325. The first and second surfaces of the rotatable sleeve 325 are each aligned with the axis of rotation.

Figure 19:
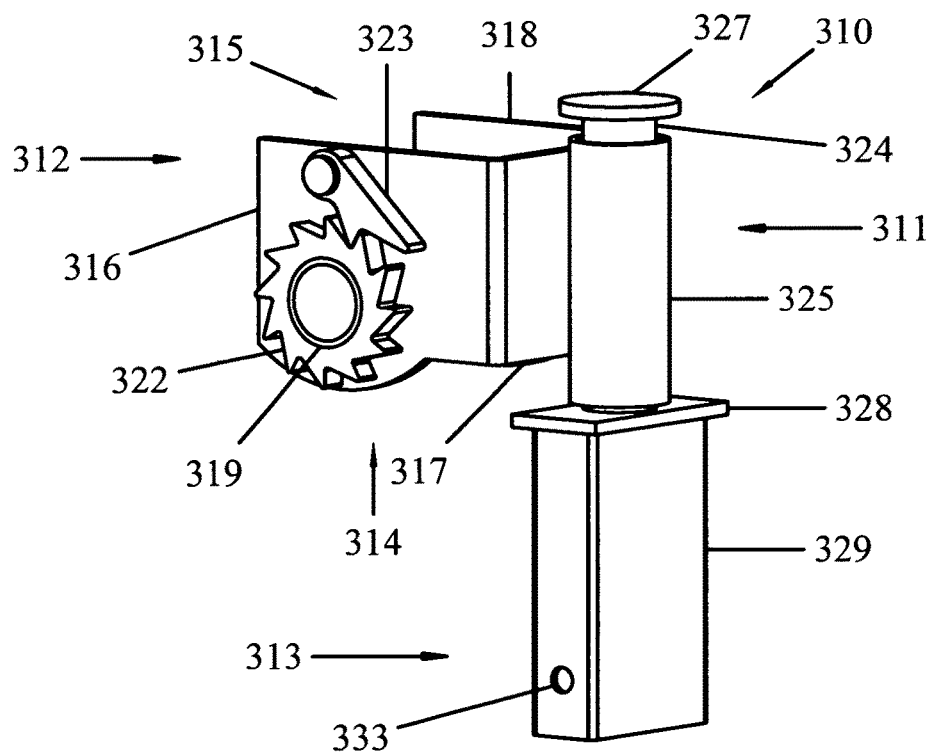
FIG. 19 is a perspective view of another embodiment of the present invention comprising a pivot, a winch, and an anchor.

The wall 317 of the winch 312 is attached to the second surface of the rotatable sleeve 325 as shown in FIG. 19 and FIG. 21, as by welding, thus permitting the winch 312 of the tie-down 310 to be pivotal about the axis of rotation of the rotatable sleeve 325 of the pivot 311. The wall 317 is parallel with the rotatable sleeve 325, in that the wall 317 is adjacent to the rotatable sleeve 325 with the proximal ends of the flanges 316 and 318 that are interconnected by the wall 317 being relatively close to the rotatable sleeve 325 and the distal ends of the flanges 316 and 318 being oppositely and relatively far from the rotatable sleeve 325. Thus, the U-shaped frame 315 has the U shape thereof opening radially outwardly away from the axis of rotation of the rotatable sleeve 325 as shown in FIG. 19.

Figure 24:
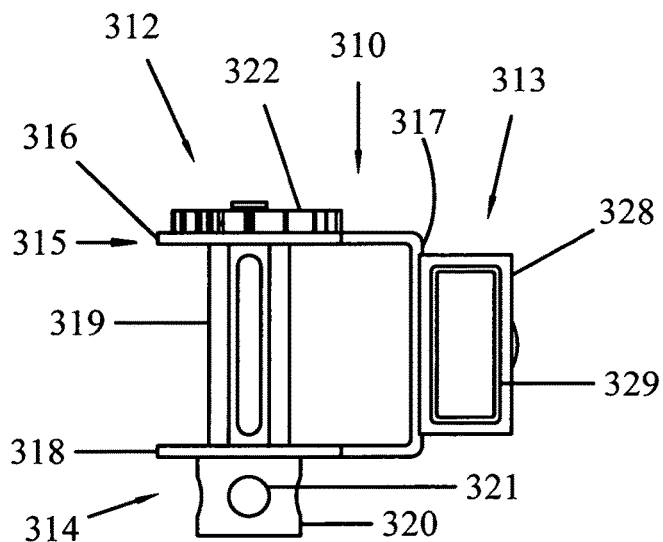
FIG. 24 is a bottom view of the embodiment of the present invention, as shown in FIG. 19.

The anchor 313 is a generally rectangularly annular tube 329. The annular tube 329 has an outer surface, first and second ends, and a length defined between the ends that spaces the second end of the annular tube 329 from the first end of the annular tube 329. The annular tube 329 has dimensions, transverse to the length of the annular tube 329 along the length thereof and in particular at the first end of the annular tube 329, that are unequal transverse widths, with a second transverse width of the annular tube 329 being greater than a first transverse width of the annular tube 329 as shown in FIG. 24. The annular tube 329 and therefore the anchor 313 are thus transversely generally rectangular. The length and the outer surface of the annular tube 329 are sized and shaped to correspond to any one of the stake pockets of the vehicle 301. The length of the annular tube 329 preferably is greater than the depth of any one of the stake pockets of the vehicle 301.

The second surface 331 of the base 328 has dimensions parallel with the transverse width and the transverse length of the plate of the base 328 that are transverse to the thickness of the plate of the base 328 and that extend through the center of the second surface 331 and that intersect the outer perimeter of the plate of the base 328 at the second surface 331. The transverse dimensions of the second surface 331 are unequal transverse width and transverse length, greater than the transverse width of the second surface 331, as shown in FIG. 21, FIG. 22, and FIG. 24. The first transverse width of the annular tube 329 and the transverse width of the second surface 331 are aligned with each other, and the second transverse width of the annular tube 329 and the transverse length of the second surface 331 are aligned with each other. As shown in FIG. 24, the transverse width of the second surface 331 of the rectangular plate of the base 328 is greater than the first transverse width of the annular tube 329 of the anchor 313. The transverse length of the second surface 331 of the rectangular plate of the base 328 is greater than the second transverse width of the annular tube 329 of the anchor 313.

The second end of the annular tube 326 of the pivot 311 is attached, as by welding, to the one side surface 330 of the base 328 and the first end of the annular tube 329 of the anchor 313 is attached, as by welding, to the other, opposite side surface 331 of the base 328. Thus, the annular tube 326 of the pivot 311, from the second end of the annular tube 326 to the first end of the annular tube 326, and the annular tube 329 of the anchor 313, from the first end of the annular tube 329 to the second end of the annular tube 329, extend in opposite directions as shown in especially FIG. 22.

The anchor 313 also has a set 332 of locking holes. The set 332 of locking holes form an aperture 333 passing entirely through the second, greater transverse width of the annular tube 329 of the anchor 313 approximately adjacent but spaced from the second end of the annular tube 329. A locking pin 334 may be inserted through the aperture 333 to prevent the tie-down 310 from being accidentally removed or dislodged from the stake pocket, as stake pocket 303 as shown in FIG. 20, that the tie-down 310 has been inserted into during the transporting of the load by the vehicle 301. A hitch pin as is commonly available may be used as the locking pin 334. A lock 335, as a keyed padlock or any other conventional lock, also may be located on the locking pin 334 to keep the locking pin 334 in place and therefore keep the tie-down 310 inserted in the stake pocket, as 303, to prevent unauthorized removal of the tie-down 310.

The anchor 313 is removably mountable within any one of the stake pockets of the vehicle 301, for selectively mounting the tie-down 310 on the vehicle 301 for securing the load on the support surface 302 for when the vehicle 301 is transporting the load, by inserting the second end of the anchor 313 into the stake pocket, as 303 as shown in FIG.

20. The transverse width and the transverse length of the second surface 331 of the rectangular plate of the base 328 is greater than the inner dimensions of any one of the stake pockets. The opposite side surface 331 therefore rests on top of the stake pocket into which the anchor 313 of the tie-down 310 is inserted as shown in FIG. 20. The anchor 313 mounts the tie-down 310 to the vehicle 301 so that the axis of rotation of the rotatable sleeve 325 is generally perpendicular to the support surface 302 to angularly position the winch 312 by pivoting the winch 312 to any plane angle about the axis of rotation relative to the support surface 302, and preferably, when the axis of rotation is generally vertical, that the winch 312 is pivotal to any angle horizontally.

In use, either before or after the load is placed on the support surface 302 of the vehicle 301 for transporting the load, one stake pocket 303 is chosen and the tie-down 310 is mounted on the vehicle 301 by inserting the second end of the anchor 313 into the one stake pocket 303. The tie-down 310 is so inserted until the base 328 rests on top of the one stake pocket 303 as shown in FIG. 20, preventing the tie-down 310 from falling all the way through the one stake pocket 303. The tie-down 310 so mounted can be easily removed for repositioning the tie-down 310 into a different stake pocket to engage with the load at a different distance and/or angle to secure the load, or can be removed for storage after completion of the transporting of the load by the vehicle 301. The locking pin 334 may then be inserted into the aperture 333 of the anchor 313, securing the tie-down 310 into the one stake pocket 303. The lock 335 then may also be located on the locking pin 334 to further secure the tie-down 310 so as to prevent unauthorized removal of the tie-down 310.

After the tie-down 310 is so mounted, and after the load is placed on the support surface 302 of the vehicle 301 for transporting the load, the strap is connected to and wound on the spindle 319, identically as shown in FIG. 2. Then, keeping the pawl 323 in its open position, the end of the strap with the attachment is pulled out and away from the tie-down 310, allowing the rotatable sleeve 325 of the pivot 311 to freely rotate to angularly position the winch 312. The attachment is then attached, identically as shown in FIG. 2, to the desired location on the load when the load is on the support surface 302. The rotatable sleeve 325 thus rotates such that the strap is automatically straight out from the spindle 319 of the winch 312 and perpendicular thereto, as being generally perpendicular by perspective with respect to the wall 317, so as to generate a force that is likewise perpendicular for securing the load to the vehicle 301 through the tie-down 310.

Subsequently, the pawl 323 is swivelled to its locking position, and the hand tool is inserted (not shown) into the engagement holes 321 of the crank 320 to rotate the spindle 319 to rewind the strap onto the spindle 319, the pawl 323 engaging the ratchet 322 and keeping the spindle 319 from unwinding the strap therefrom, thereby tightening the strap to secure, identically as shown in FIG. 2, the load onto the support surface 302 of the vehicle 301 to prevent the load from unintentionally moving relative to the support surface 302 during the transporting thereof. In actual use as many or as few of the tie-downs of the tie-down system 300 that are needed are used in order to secure the load, with the straps thereof being tightened progressively sequentially until the load is fully secured, so as to meet, for example, force limits, legal requirements, etc. necessary for the transporting of the load. The tie-down system 300 thus quickly secures the load to the vehicle 301, while also providing for the selectively mounting of any number of the tie-downs of the tie-down system 300 into the stake pockets of the vehicle 301, providing security to the tie-downs of the tie-down system 300 from unauthorized removal, and providing less waste of production material of the tie-downs of the tie-down system 300.

The embodiments of the present invention may be made by any method. Preferably, because hand winches are widely available, a premanufactured hand winch may be the basis for the winch of any of the embodiments of the present invention. Portions of the premanufactured hand winch may be disassembled or cut off, and reassembled or reattached to form the winch of any of the embodiments of the present invention. Preferably, the interconnecting wall of a U-shaped frame of a premanufactured winch may be cut off therefrom and reattached, as by welding, to form the U-shaped frame in accordance with the winch of any of the embodiments of the present invention. This newly made U-shaped frame then is attached to the rotatable sleeve of the pivot of the tie-down in accordance with the present invention.

We claim:

1. A tie-down comprising:
 a pivot comprising:
  a pin having a first end, a second end, and
  a length spacing said second end from said first end,
  a cap attached to said first end,
  a base having a first surface, a second surface, and a thickness spacing said second surface from said first surface, wherein said base is attached to said pin, and
  a rotatable sleeve on said pin, and having a first end, a second end, and a length spacing said second end of said sleeve from said first end of said sleeve, wherein said sleeve is on said pin in between said cap and said first surface of said base;
 a winch comprising:
  a frame comprising:
   two flanges, and
   a wall interconnecting said flanges, and
  a spindle rotatably mounted on said flanges; and
 an anchor attached to said base;
wherein:
 said pivot has an axis of rotation aligned with said lengths;
 said sleeve further has a first surface, a second surface, and a thickness spacing said second surface of said sleeve from said first surface of said sleeve;
 each said surface of said sleeve is aligned with said axis of rotation;
 said sleeve is rotatable about said axis of rotation;
 said pin is adjacent to said first surface of said sleeve; and
 said frame is attached to said second surface of said sleeve.

2. The tie-down of claim 1, wherein said wall is parallel with said sleeve; and
 wherein said wall is attached to said second surface of said sleeve.

3. The tie-down of claim 1, wherein said first surface of the said base is attached to said second end of said pin;
 wherein said second surface of said base is attached to said anchor;
 wherein said second surface of said base has a transverse dimension;
 wherein said anchor has a transverse dimension;
 wherein said dimensions are aligned with each other; and
 wherein said transverse dimension of said second surface of said base is greater than said transverse dimension of said anchor.

4. The tie-down of claim 3, wherein said transverse dimension of said second surface of said base is a diameter; and
wherein said transverse dimension of said anchor is a diameter.

5. The tie-down of claim 1, wherein said first surface of said base is attached to said seocnd end of said pin;
wherein said second surface of said base is attached to said anchor;
wherein said second surface of said base has transverse dimensions comprising a width and a length greater than said width;
wherein said anchor has transverse dimensions comprising a first width and a second width greater than said first width;
wherein said width of said second surface of said base is greater than said first width; and
wherein said length of said second surface of said base is greater than said second width.

6. The tie-down of claim 1, wherein base has an aperture;
wherein said pin has a first end and a second end;
wherein said pin is in said aperture;
wherein said base is on said pin in between said first end and said second end;
wherein said base further has transverse dimensions comprising a width and a length greater than said width;
wherein said anchor has transverse dimensions comprising a first width and a second width greater than said first width;
wherein said width of said base is greater than said first width; and
wherein said length is greater than said second width.

7. The tie-down of claim 1, wherein said anchor is a generally solid bar.

8. The tie-down of claim 7, wherein:
said first surface of said base is attached to said second end of said pin;
said second surface of said base is attached to said anchor;
said cap comprises a plate; and
said base comprises a plate.

9. The tie-down of claim 1, wherein:
said pin comprises a generally solid bar;
said bar has said first end of said pin and said second end of said pin;
said first surface of said base is attached to said second end of said pin;
said second surface of said base is attached to said anchor;
said cap comprises a plate; and
said base comprises a plate.

10. The tie-down of claim 1, wherein said anchor is C-shaped.

11. The tie-down of claim 10, wherein said first surface of said base is attached to said second end of said pin;
wherein said second surface of said base is attached to said anchor;
wherein said second surface of said base has transverse dimensions comprising a width and a length greater than said width;
wherein said anchor has transverse dimensions comprising a first width and a second width greater than said first width;
wherein said width of said second surface of said base is greater than said first width; and
wherein said length of said second surface of said base is greater than said second width.

12. The tie-down of claim 11, wherein:
said cap comprises a plate; and
said base comprises a plate.

13. The tie-down of claim 10, wherein:
said pin comprises a generally solid bar;
said bar has said first end of said pin and said second of said pin;
said first surface of said base is attached to said second end of said pin;
said second surface of said base is attached to said anchor;
said cap comprises a plate; and
said base comprises a plate.

14. The tie-down of claim 1, wherein said base further has an aperture;
wherein said pin is in said aperture;
wherein said pin comprises a part thereof that is between said first end of said pin and said first surface of said base, and a part thereof that is between said second surface of said base and said second end of said pin;
wherein said anchor comprises:
two generally C-shaped channels parallel with each other and in between said second surface of said base and said second end of said pin; and
said part of said pin that is between said second surface of said base and said second end of said pin; and
wherein said channels sandwich said part of said pin that is between said second surface of said base and said second end of said pin.

15. The tie-down of claim 14, wherein said base is on said pin in between said first end of said pin and said second end of said pin;
wherein said second surface of said base has transverse dimensions comprising a width and a length greater than said width;
wherein said anchor has transverse dimensions comprising a first width and a second width greater than said first width;
wherein said width of said second surface of said base is greater than said first width; and
wherein said length of said second surface of said base is greater than said second width.

16. The tie-down of claim 15, wherein:
said cap comprises a plate; and
said base comprises a plate.

17. The tie-down of claim 14, wherein:
said pin comprises a generally solid bar;
said bar has said first end of said pin and said second end of said pin;
said cap comprises a plate;
said base is on said bar in between said first end said pin and said second end of said pin; and
said base comprises a plate.

18. The tie-down of claim 1, wherein said base further has an aperture; and
wherein:
said pin comprises a generally solid bar;
said bar has said first end of said pin and said second end of said pin;
said cap comprises a plate;
said bar is in said aperture;
said base is on said bar in between said first end of said pin and said second end of said pin; and
said base comprises a plate.

19. The tie-down of claim 1, wherein said anchor is annular.

20. The tie-down of claim 19, wherein said first surface of said base is attached to said second end of said pin;
   wherein said second surface of said base is attached to said anchor;
   wherein said second surface of said base has transverse dimensions comprising a width and a length greater than said width;
   wherein said anchor has transverse dimensions comprising a first width and a second width greater than said first width;
   wherein said width of said second surface of said base is greater than said first width; and
   wherein said length of said second surface of said base is greater than said second width.

21. The tie-down of claim 20, wherein:
   said cap comprises a plate; and
   said base comprises a plate.

22. The tie-down of claim 19, wherein:
   said pin comprises a generally annular tube;
   said tube has said first end of said pin and said second end of said pin;
   said first surface of said base is attached to said second end of said pin;
   said second surface of said base is attached to said anchor;
   said cap comprises a plate; and
   said base comprises a plate.

23. The tie-down of claim 1, wherein:
   said pin comprises a generally annular tube;
   said tube has said first end of said pin and said second end of said pin;
   said first surface of said base is attached to said second end of said pin;
   said second surface of said base is attached to said anchor;
   said cap comprises a plate; and
   said base comprises a plate.

24. A vehicle for transporting a load comprising:
   a support surface for supporting the load when said vehicle is transporting the load; and
   a plurality of tie-downs for securing the load on said support surface for when said vehicle is transporting the load;
   wherein each respective said tie-down comprises:
   a pivot comprising:
      a pin having a first end, a second end, and a length spacing said second end from said first end,
      a cap attached to said first end,
      a base having a first surface, a second surface, and a thickness spacing said second surface from said first surface, wherein said base is attached to said pin, and
      a rotatable sleeve on said pin, and having a first end, a second end, and a length spacing said second end of said sleeve from said first end of said sleeve, wherein said sleeve is on said pin in between said cap and said first surface of said base;
   a winch comprising:
      a frame comprising:
         two flanges, and
         a wall interconnecting said flanges, and
      a spindle rotatably mounted on said flanges; and
   an anchor attached to said base; and
   wherein, for each said respective tie-down:
   said pivot has an axis of rotation aligned with said lengths;
   said sleeve further has a first surface, a second surface, and a thickness spacing said second surface of said sleeve from said first surface of said sleeve;
   each said surface of said sleeve is aligned with said axis of rotation;
   said sleeve is rotatable about said axis of rotation;
   said pin is adjacent to said first surface of said sleeve; and
   said frame is attached to said second surface of said sleeve.

25. The vehicle of claim 24, wherein, for each said respective tie-down:
   said wall is parallel with said sleeve; and
   said wall is attached to said second surface of said sleeve.

26. The vehicle of claim 24, wherein at least one said tie-down of said plurality is attached to said vehicle.

27. The vehicle of claim 26, wherein said anchor of said one tie-down is a generally solid bar; and
   wherein said bar is attached to said support surface.

28. The vehicle of claim 24, further comprising stake pockets adjacent to said support surface;
   wherein said anchor of at least one said tie-down of said plurality is removably mountable within one respective said stake pocket for selectively mounting said one tie-down on said vehicle for securing the load on said support surface for when said vehicle is transporting the load.

29. The vehicle of claim 28, wherein said anchor of said one tie-down is C-shaped.

30. The vehicle of claim 28, wherein, for said one tie-down:
   said base further has an aperture;
   said pin is in said aperture;
   said pin comprises a part thereof that is between said first end of said pin and said first surface of said base, and a part thereof that is between said second surface of said base and said second end of said pin;
   said anchor comprises:
      two generally C-shaped channels parallel with each other and in between said second surface of said base and said second end of said pin, and
      said part of said pin that is between said second surface of said base and said second end of said pin; and
   said channels sandwich said part of said pin that is between said second surface of said base and said second end of said pin.

31. The vehicle of claim 30, wherein said anchor of said one tie-down further comprises a set of locking holes.

32. The vehicle of claim 28, wherein said anchor of said one tie-down is annular.

33. The vehicle of claim 32, wherein said anchor of said one tie-down comprises a set of locking holes.

34. In combination:
   a pivot comprising:
      a pin having a first end, a second end, and a length spacing said second end from said first end,
      a cap attached to said first end,
      a base having an outer perimeter, a first surface, a second surface, and a thickness spacing said second surface from said first surface, wherein said base is attached to said pin, and
      a rotatable sleeve having a first end, a second end, and a length spacing said second end of said sleeve from said first end of said sleeve, wherein said sleeve is on said pin in between said cap and said first surface of said base; and
   an anchor having a first end, a second end, and a length spacing said second end of said anchor from said first end of said anchor;

wherein:

said pivot has an axis of rotation aligned with said lengths of said pin and of said sleeve;

said sleeve further has a first surface, a second surface, and a thickness spacing said second surface of said sleeve from said first surface of said sleeve;

each said surface of said sleeve is aligned with said axis of rotation;

said pin is adjacent to said first surface of said sleeve; and said sleeve is rotatable about said axis of rotation;

wherein:

said first end of said anchor is attached to said second surface of said base; and said anchor, from said first end of said anchor to said second end of said anchor, and said pin, from said second end of said pin to said first end of said pin, extend in opposite directions;

wherein:

said anchor further has a dimension at said first end of said anchor transverse to said length of said anchor;

said second surface of said base has a dimension intersecting said outer perimeter transverse to said thickness of said base; and said dimensions are aligned with each other; and wherein, at said second surface of said base:

said dimension of said second surface of said base is greater than said dimension of said anchor.

35. The combination of claim 34, wherein:

said dimension of said second surface of said base is a diameter; and said dimension of said anchor is a diameter.

36. The combination of claim 34, wherein:

said dimension of said second surface of said base is a width;

said second surface of said base further has a length intersecting said outer perimeter transverse to said thickness of said base;

said length of said second surface of said base is greater than said width;

said dimension of said anchor is a first width;

said anchor further has a second width at said first end of said anchor transverse to said length of said anchor;

said second width is greater than said first width;

said width of said second surface of said base is greater than said first width; and said length of said second surface of said base is greater than said second width.

37. The combination of claim 34, wherein:

said second end of said pin is attached to said first surface of said base;

said pin comprises a generally solid bar comprising said ends of said pin;

said cap comprises a plate;

said base comprises a plate comprising said surfaces of said base; and said anchor comprises a generally solid bar comprising said ends of said anchor.

38. The combination of claim 34, wherein:

said second end of said pin is attached to said first surface of said base;

said pin comprises a generally solid bar comprising said ends of said pin;

said cap comprises a plate;

said base comprises a plate comprising said surfaces of said base; and said anchor is C-shaped.

39. The combination of claim 34, wherein:

said base further has an aperture;

said pin is in said aperture;

said base is on said pin in between said first end of said pin and said second end of said pin;

said pin comprises a part thereof that is between said first end of said pin and said first surface of said base, and a part thereof that is between said second surface of said base and said second end of said pin;

said anchor comprises:

two generally C-shaped channels parallel with each other and in between said second surface of said base and said second end of said pin, and said part of said pin that is between said second surface of said base and said second end of said pin; and said channels sandwich said part of said pin that is between said second surface of said base and said second end of said pin.

40. The combination of claim 34, wherein:

said second end of said pin is attached to said first surface of said base;

said pin comprise a generally annular tube comprising said ends of said pin;

said cap comprises a plate;

said base comprises a plate comprising said surfaces of said base; and said anchor is annular.

* * * * *

UNITED STATES PATENT AND TRADEMARK OFFICE
CERTIFICATE OF CORRECTION

| | | |
|---|---|---|
| PATENT NO. | : 11,981,247 B2 | Page 1 of 1 |
| APPLICATION NO. | : 16/873538 | |
| DATED | : May 14, 2024 | |
| INVENTOR(S) | : Maners et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1046 days.

Signed and Sealed this
Eighth Day of October, 2024

Katherine Kelly Vidal
*Director of the United States Patent and Trademark Office*